(12) United States Patent
Mogi

(10) Patent No.: US 9,110,275 B2
(45) Date of Patent: Aug. 18, 2015

(54) ZOOM LENS AND IMAGE-PICKUP APPARATUS

(71) Applicant: CANON KABUSHIKI KAISHA, Tokyo (JP)

(72) Inventor: Shuichi Mogi, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 13/960,736

(22) Filed: Aug. 6, 2013

(65) Prior Publication Data
US 2014/0043692 A1 Feb. 13, 2014

(30) Foreign Application Priority Data
Aug. 8, 2012 (JP) .................. 2012-176036

(51) Int. Cl.
G02B 15/14 (2006.01)
G02B 9/60 (2006.01)
G02B 15/173 (2006.01)
G02B 27/64 (2006.01)

(52) U.S. Cl.
CPC  *G02B 15/14* (2013.01); *G02B 9/60* (2013.01); *G02B 15/173* (2013.01); *G02B 27/646* (2013.01)

(58) Field of Classification Search
CPC .................................. G02B 15/14; G02B 9/60
USPC ................................... 359/676–685
See application file for complete search history.

(56) References Cited

U.S. PATENT DOCUMENTS 8,169,711 B2    5/2012  Fujisaki
8,331,034 B2   12/2012  Kimura
2011/0085248 A1*  4/2011  Ohtake et al. ................. 359/683

FOREIGN PATENT DOCUMENTS

JP    2010-276655 A   12/2010
JP    2011-81113 A     4/2011

* cited by examiner

*Primary Examiner* — Thomas K Pham
*Assistant Examiner* — Mitchell Oestreich
(74) *Attorney, Agent, or Firm* — Carter, DeLuca, Farrell & Schmidt, LLP

(57) ABSTRACT

A zoom lens includes, in order from an object side to an image side, a first, a second, a third, a fourth and a fifth lens units respectively having positive, negative, positive, negative, and positive refractive powers. The first lens unit includes negative, positive, and positive lenses in order from the object side to the image side. The second lens unit includes negative, negative, and positive lenses in order from the object side to the image side. Each lens unit moves during zooming. The predetermined conditional expressions are satisfied.

8 Claims, 17 Drawing Sheets

ZOOM LENS AND IMAGE-PICKUP APPARATUS

BACKGROUND OF THE INVENTION

1. Field of the Invention

The present invention relates to a zoom lens suitable, for example, such as a digital still camera, a video camera, a security camera, a broadcast camera and a silver-halide film camera.

2. Description of the Related Art

A wide angle of view, a high zoom ratio and a high optical performance in the entire zoom range zoom lens is demanded for an image-pickup lens for an image-pickup apparatus.

A five groups zoom lens comprising, in order from an object side to an image side, a first lens unit having a positive refractive power, a second lens unit having a negative refractive power, a third lens unit having a positive refractive power, a fourth lens unit having a negative refractive power, and a fifth lens unit having a positive refractive power is known (U.S. Pat. No. 8,169,711, U.S. Pat. No. 8,331,034).

If a zoom lens having five lens units of the above refractive power arrangements makes the focal length of the telephoto end longer so as further to achieve high zoom ratio, maintaining of high optical performance is difficult since aberration such as spherical aberration, astigmatism, and chromatic aberration in the zoom range of the telephoto end increases. Additionally, if refractive power of each lens unit is stronger so as to make the entire system smaller, correction of aberration such as axial chromatic aberration, chromatic aberration of magnification and comatic aberration at the telephoto end is difficult since a lot of the above aberration generate.

SUMMARY OF THE INVENTION

The present invention provides a zoom lens having a high zoom ratio, a high optical performance in the entire zoom range and a small entire optical system, and an image-pickup apparatus having the same.

A zoom lens as one aspect of the present invention includes, in order from an object side to an image side, a first lens unit having a positive refractive power, a second lens unit having a negative refractive power, a third lens unit having a positive refractive power, a fourth lens unit having a negative refractive power, and a fifth lens unit having a positive refractive power. The first lens unit comprises a negative lens, a positive lens, and a positive lens in order from the object side to the image side. The second lens unit comprises a negative lens, a negative lens, and a positive lens in order from the object side to the image side. Each lens unit moves during zooming so that a distance between the first lens unit and the second lens unit at a telephoto end is longer than the distance at a wide-angle end, a distance between the second lens unit and the third lens unit at the telephoto end is shorter than she distance at the wide-angle end, a distance between the third lens unit and the fourth lens unit at the telephoto end is longer than the distance at the wide-angle end, and a distance between the fourth lens unit and the fifth lens unit at the telephoto end is longer than the distance at the wide-angle end. The following conditions are satisfied:

$$-16.0 < M2/M4 < -1.8$$

$$0.2 < (\beta 2t/\beta 2w)/(ft/fw) < 0.5$$

where M2 and M4 respectively represent movement amounts of the second lens unit and the fourth lens unit during the zooming from the wide-angle end to the telephoto end, $\beta 2w$ and $\beta 2t$ respectively represent lateral magnifications of the second lens unit at the wide-angle end and the telephoto end, and fw and ft respectively represent focal lengths of an entire system at the wide-angle end and the telephoto end.

Further features of the present invention will become apparent from the following description of exemplary embodiments (with reference to the attached drawings).

DESCRIPTION OF THE EMBODIMENTS

A detailed description will be given of an embodiment of the present invention with reference to be the accompanying drawings. The zoom lens of the present invention comprises, in order from an object side to an image side, a first lens unit having a positive refractive power, a second lens unit having a negative refractive power, a third lens unit having a positive refractive power, a fourth lens unit having a negative refractive power, and a fifth lens unit having a positive refractive power. Lens unit having a refractive power may be arranged at least one side of the object side of the first lens unit and the image side of the fifth lens unit.

The first lens unit comprises a negative lens, a positive lens and a positive lens in order from the object side to the image side. The second lens unit comprises a negative lens, a negative lens, and a positive lens in order from the object side to the image side. At a telephoto end compared with at a wide-angle end, an interval between the first lens unit and the second lens unit is longer, and an interval between the second lens unit and the third lens unit is shorter. Further, each lens unit moves during zooming so that an interval between third lens and fourth lens is longer and an interval between fourth lens and fifth lens is longer. Rear focus type zoom lens focused by moving the fifth lens unit on an optical axis is adopted.

Figure 1:
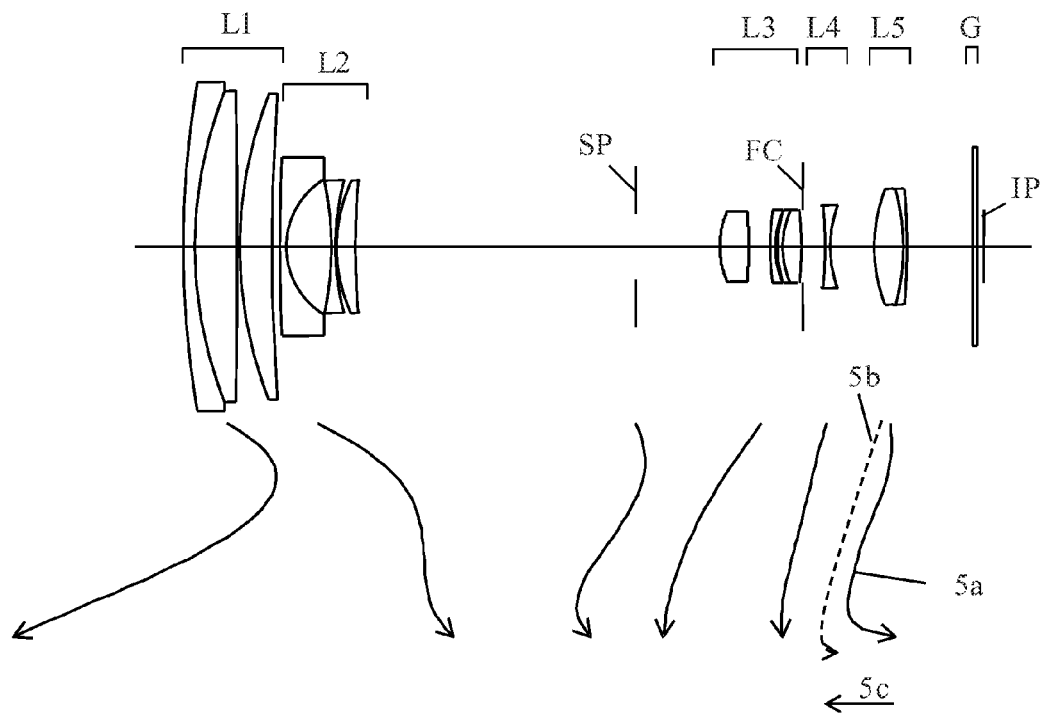
FIG. 1 is a sectional view at a wide-angle end of a zoom lens according to a first embodiment.
Figure 2A:
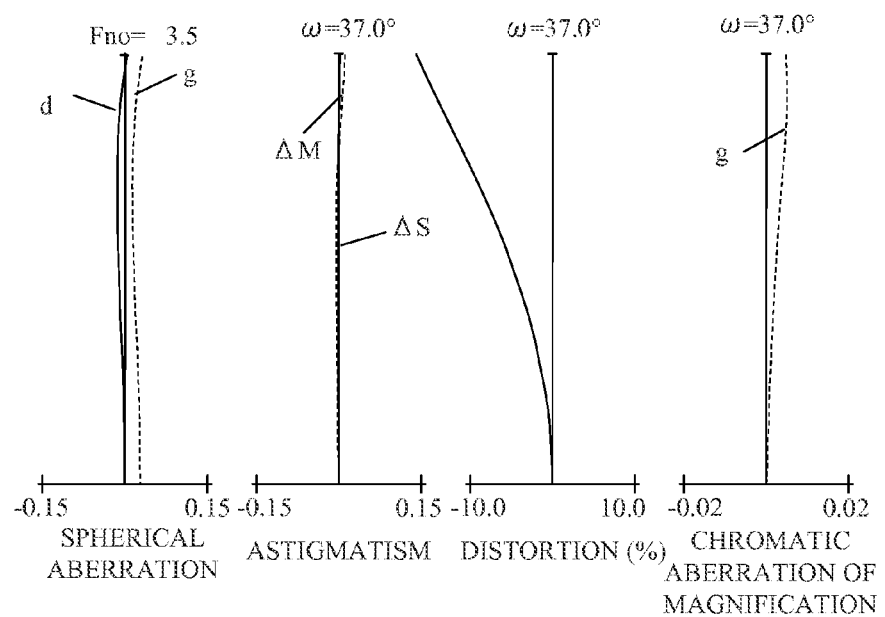
FIGS. 2A, 2B, and 2C are aberration diagrams at a wide-angle end, a middle of zoom position, and a telephoto end of the zoom lens according to the first embodiment.
Figure 2B:
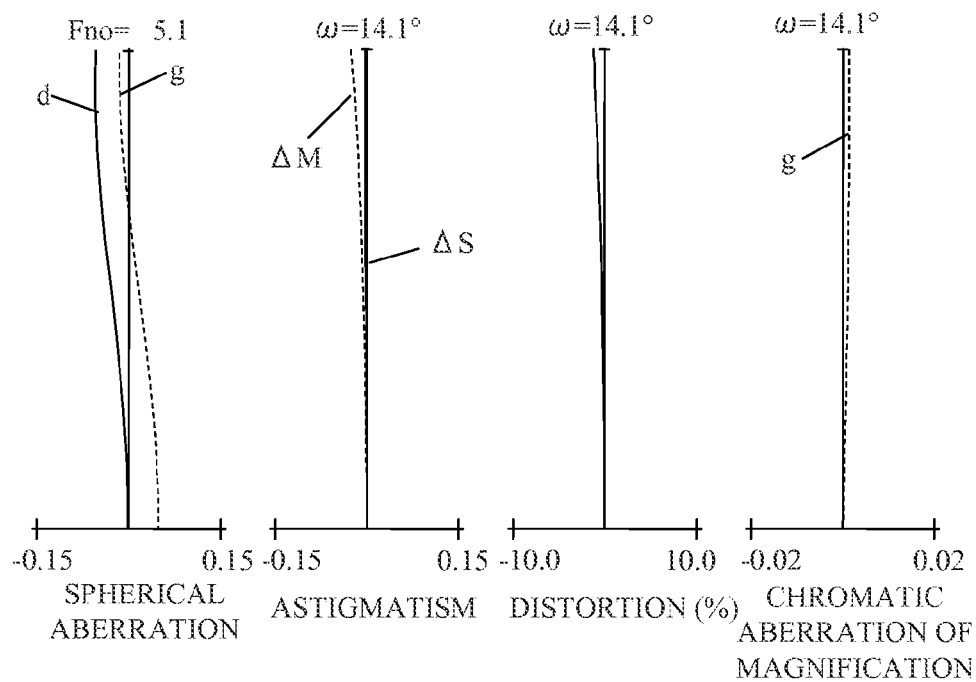
Figure 2C:
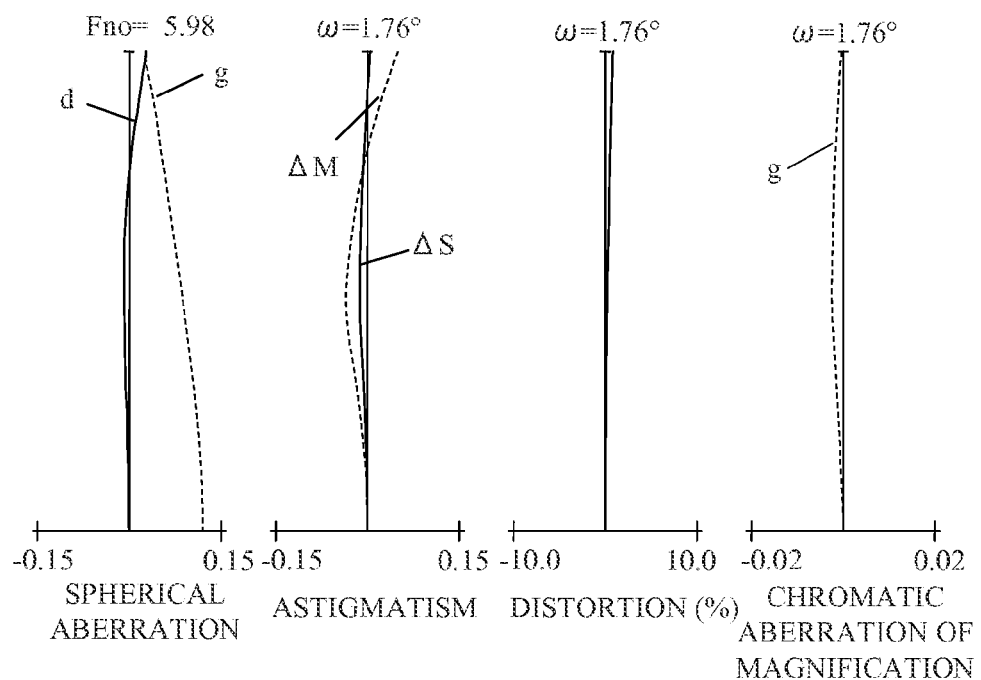
Figure 3:
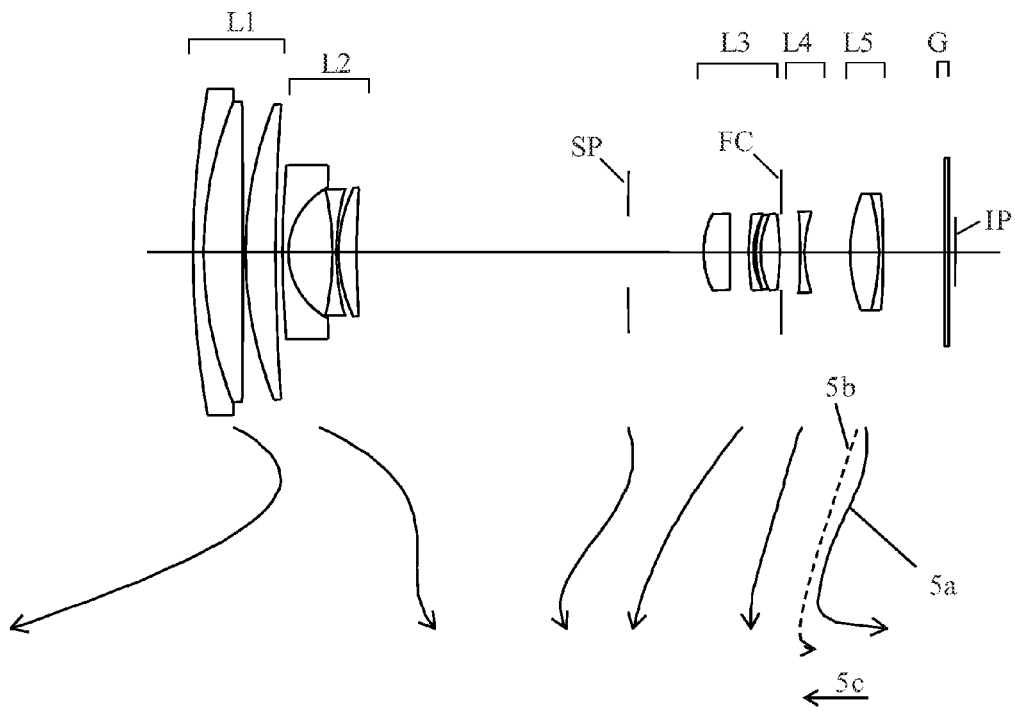
FIG. 3 is a sectional view at a wide-angle end of a zoom lens according to a second embodiment.
Figure 4A:
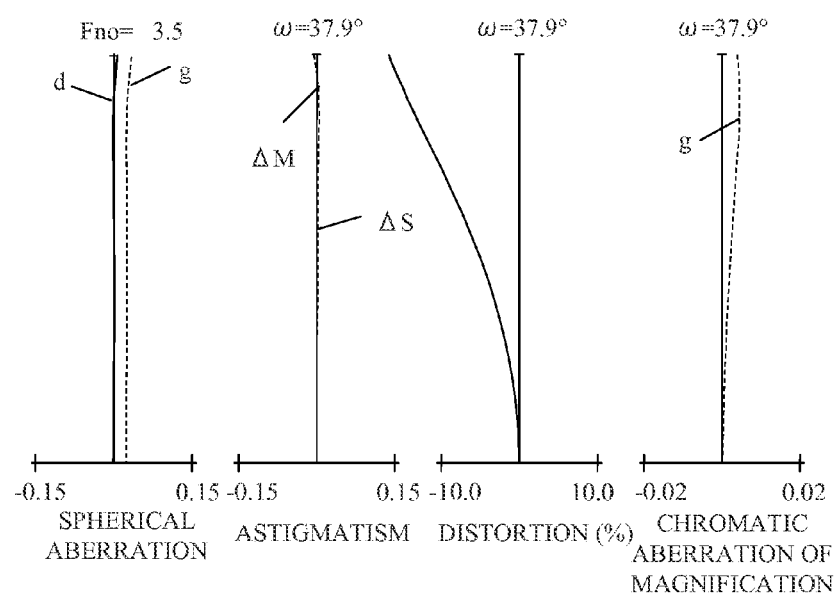
FIGS. 4A, 4B and 4C are aberration diagrams at a wide-angle end, a middle of zoom position, and a telephoto end of the zoom lens according to the second embodiment.
Figure 4B:
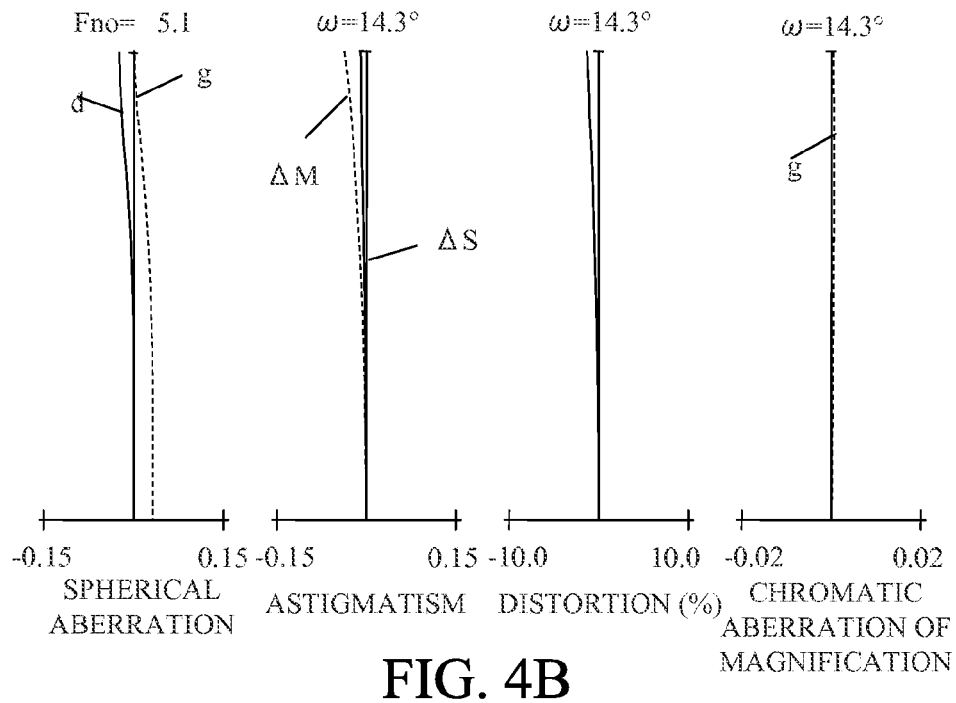
Figure 4C:
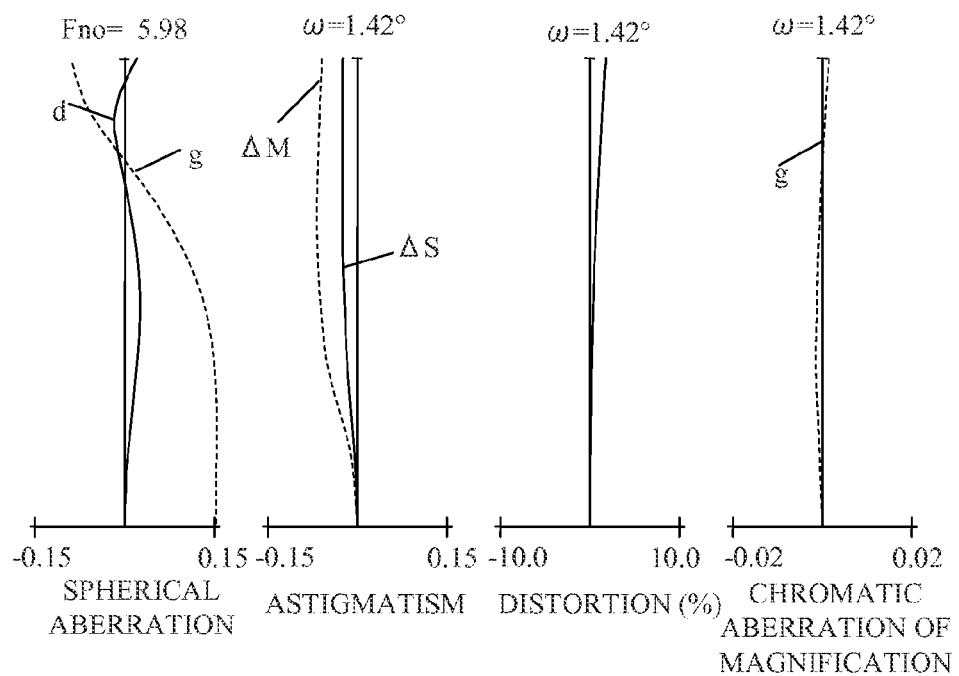

FIG. 1 is a sectional view at a wide-angle end of a zoom lens according so a first embodiment of the present invention. FIGS. 2A, 2B, and 2C are aberration diagrams at a wide-angle end, a middle of zoom position, and a telephoto end (a long focal length end) of the zoom lens according to the first embodiment. FIG. 3 is a sectional view at a wide-angle end of a zoom lens according to a second embodiment of the present invention. FIGS. 4A, 4B and 4C are aberration diagrams at a wide-angle end, a middle of zoom position, and a telephoto end of the zoom lens according to the second embodiment.

Figure 5:
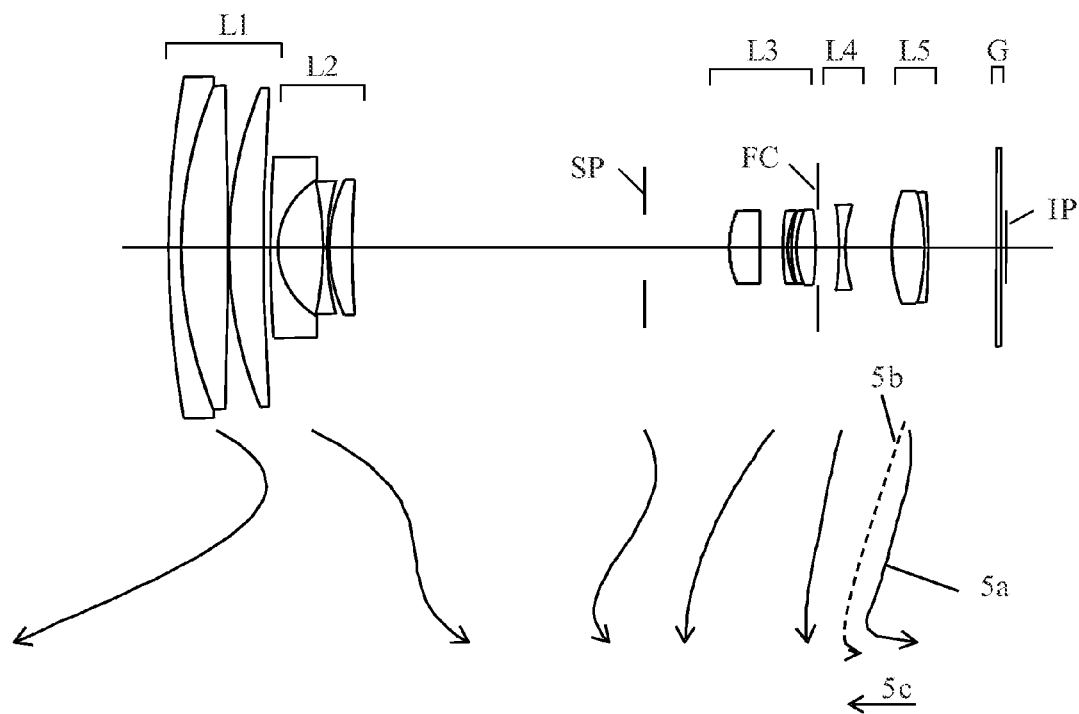
FIG. 5 is a sectional view at a wide-angle end of a zoom lens according to a third embodiment.
Figure 6A:
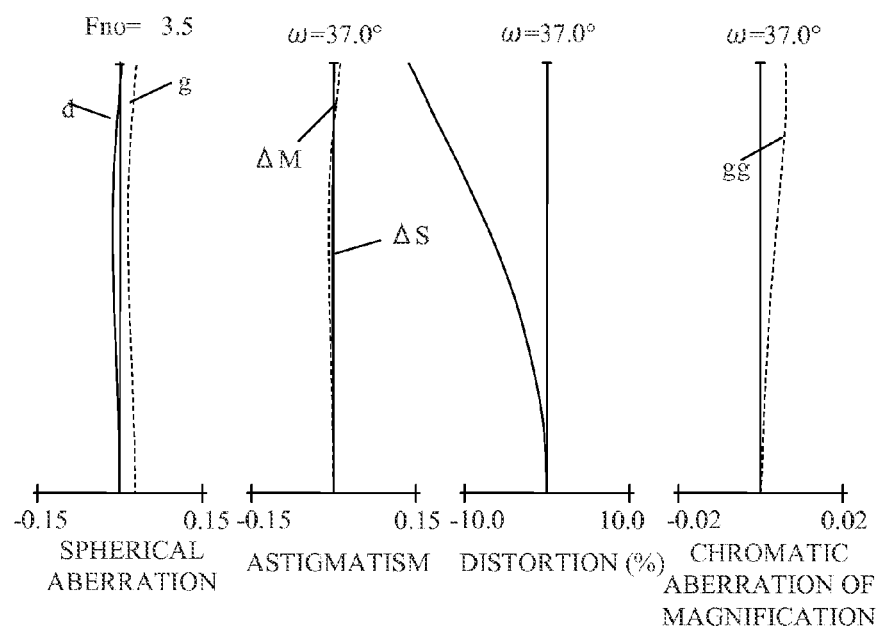
FIGS. 6A, 6B and 6C are aberration diagrams at a wide-angle end, a middle of zoom position, and a telephoto end of the zoom lens according to the third embodiment.
Figure 6B:
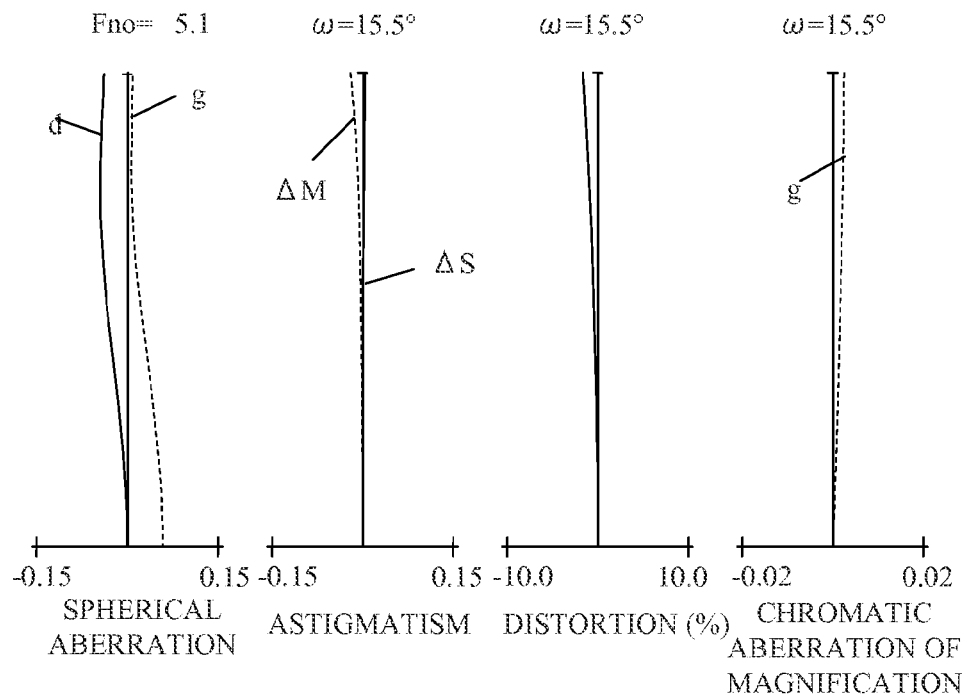
Figure 6C:
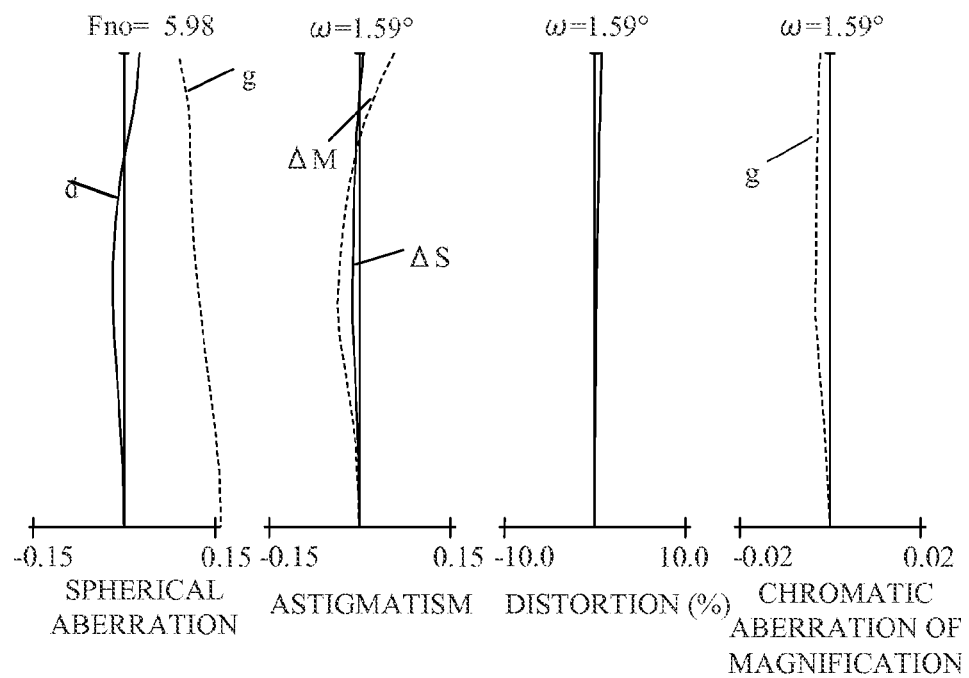
Figure 7:
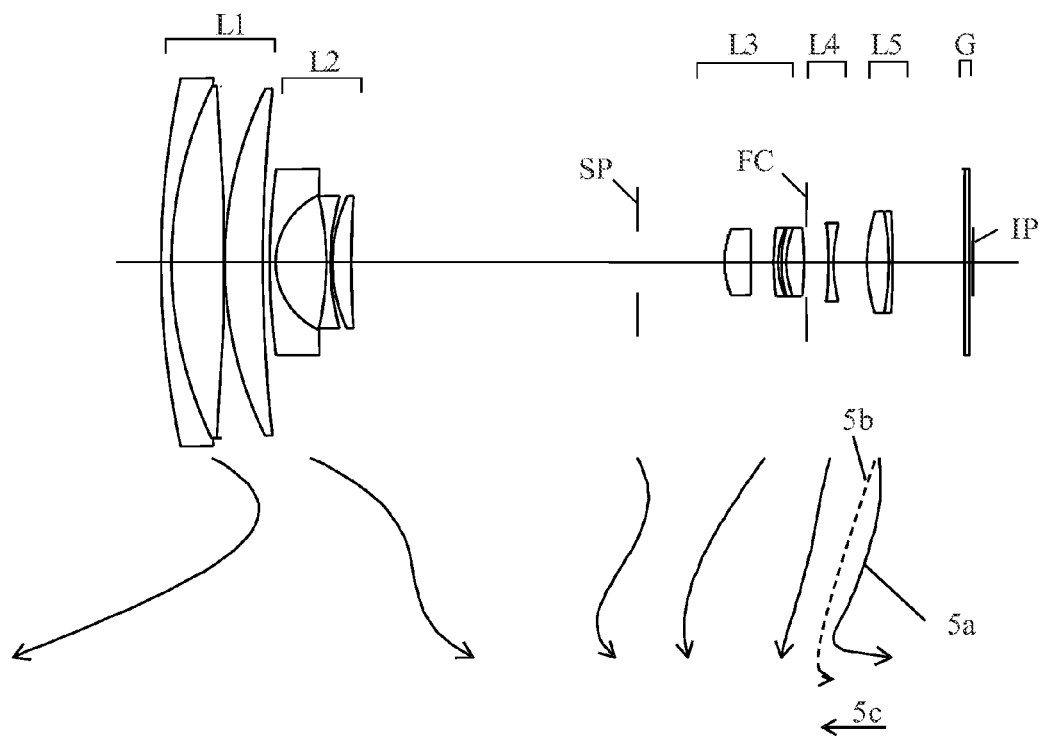
FIG. 7 is a sectional view at a wide-angle end of a zoom lens according to a fourth embodiment.
Figure 8A:
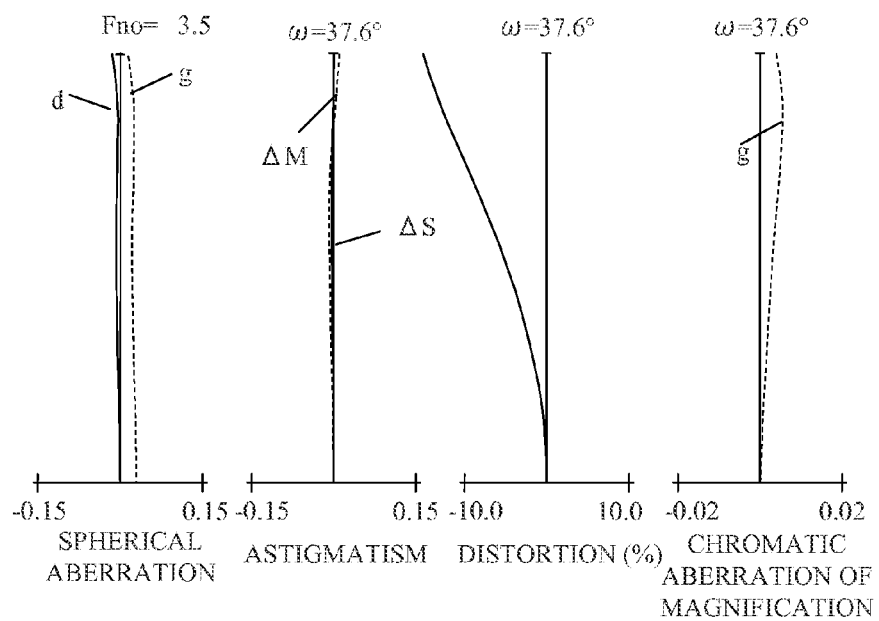
FIGS. 8A, 8B and 8C are aberration diagrams at a wide-angle end, a middle of zoom position, and a telephoto end of the zoom lens according to the fourth embodiment.
Figure 8B:
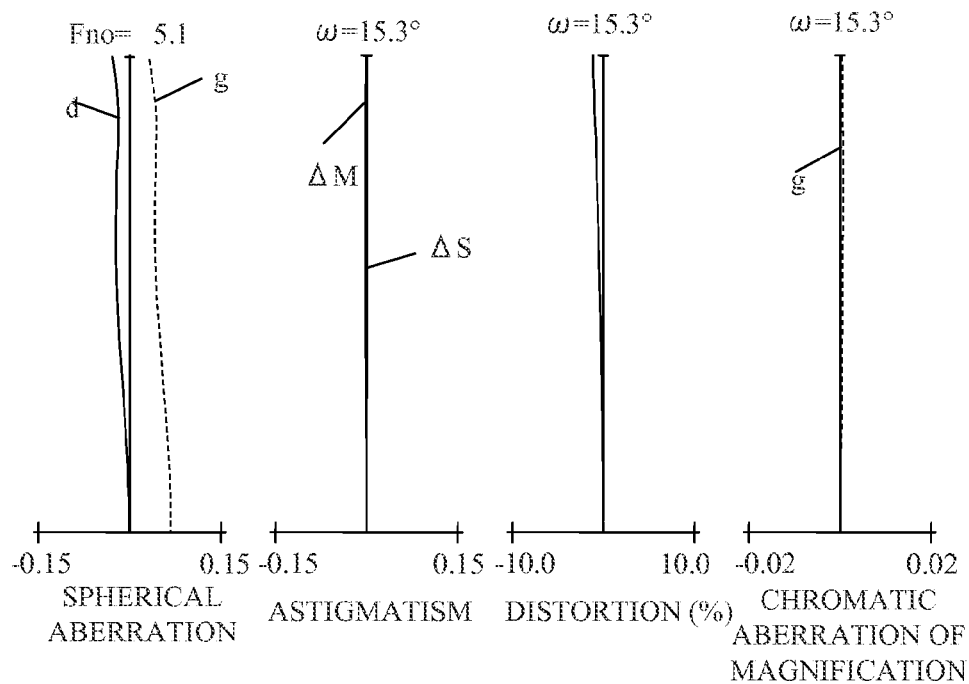
Figure 8C:
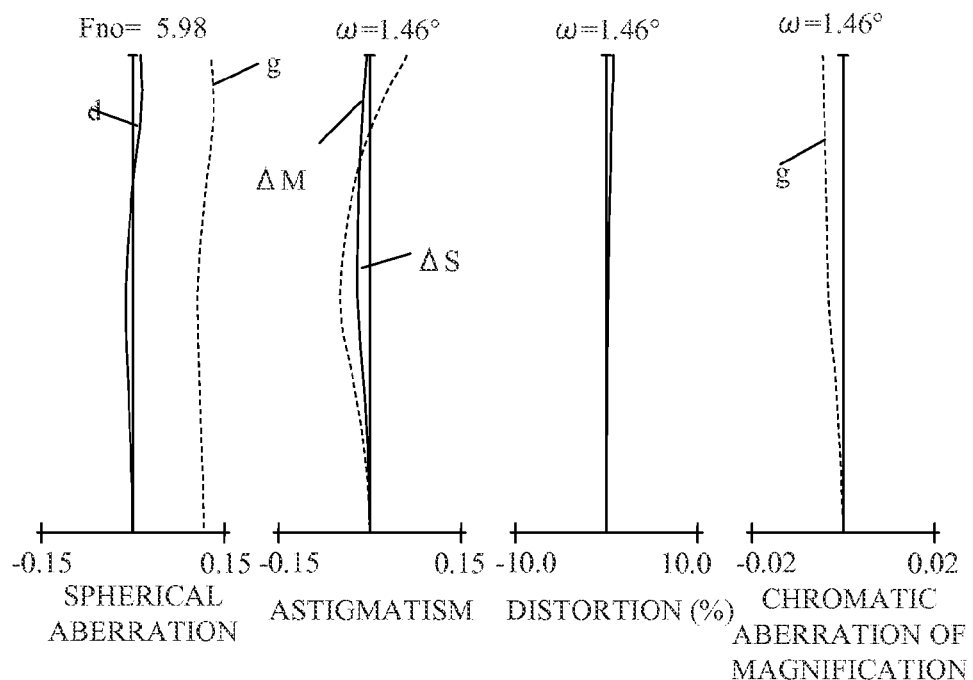

FIG. 5 is a sectional view at a wide-angle end of a zoom lens according to a third embodiment of the present invention. FIGS. 6A, 6B and 6C are aberration diagrams at a wide-angle end, a middle of zoom position, and a telephoto end of the zoom lens according to the third embodiment. FIG. 7 is a sectional view at a wide-angle end of a zoom lens according to a fourth embodiment of the present invention. FIGS. 8A, 8B and 8C are aberration diagrams at a wide-angle end, a middle of zoom position, and a telephoto end of the zoom lens according to the fourth embodiment.

Figure 9:
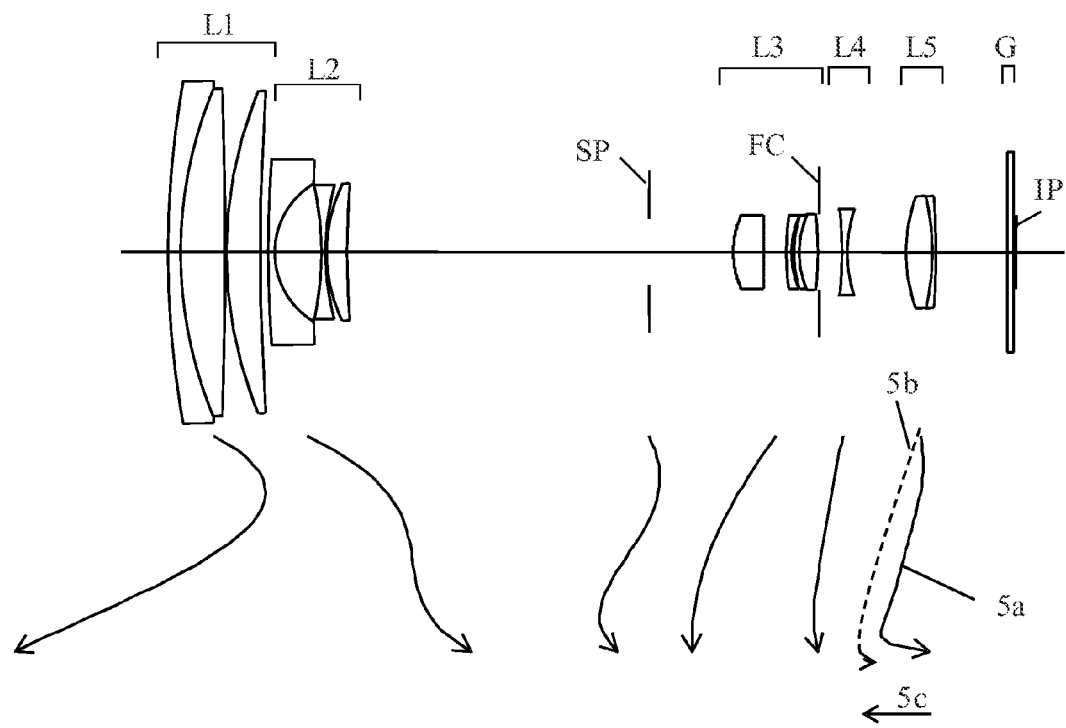
FIG. 9 is a sectional view at a wide-angle end of a zoom lens according to a fifth embodiment.
Figure 10A:
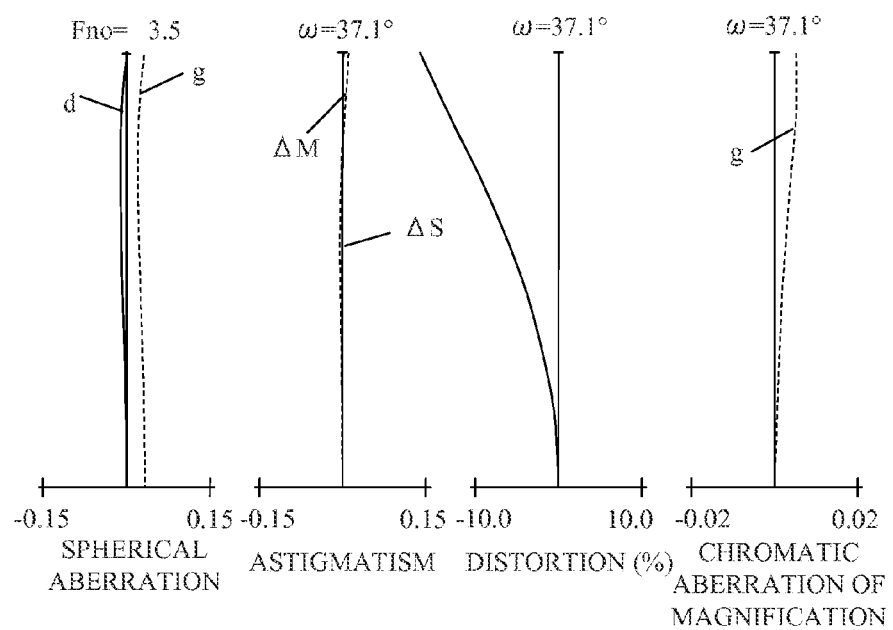
FIGS. 10A, 10B and 10C are aberration diagrams at a wide-angle end, a middle of zoom position, and a telephoto end of the zoom lens according to the fifth embodiment.
Figure 10B:
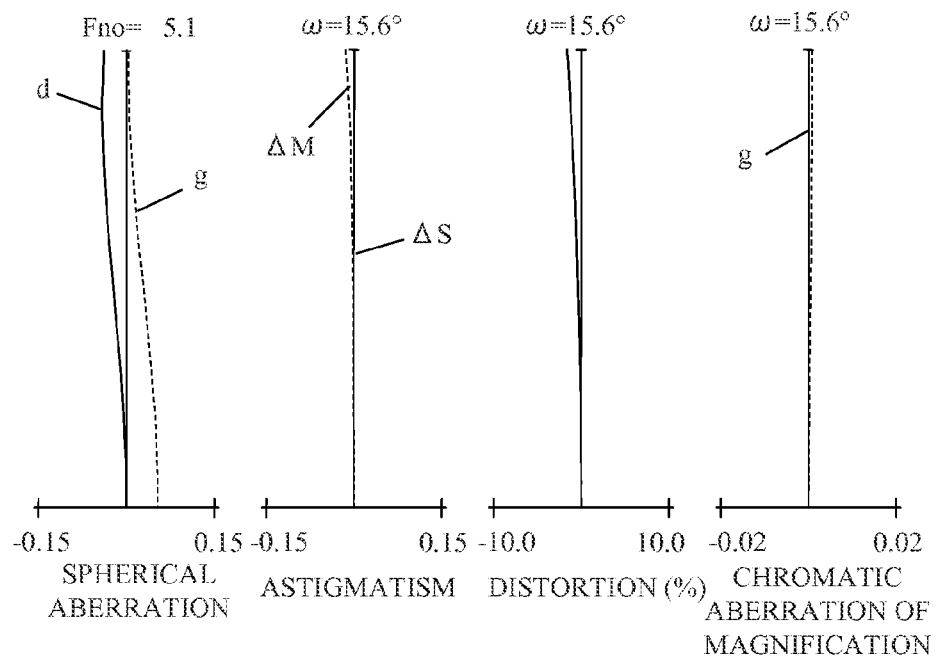
Figure 10C:
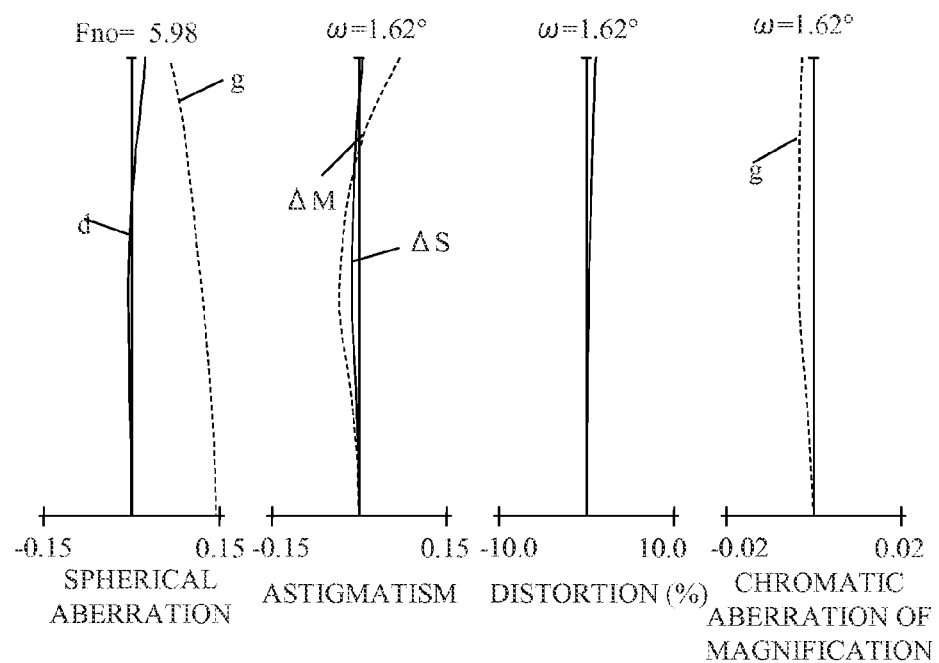
Figure 11:
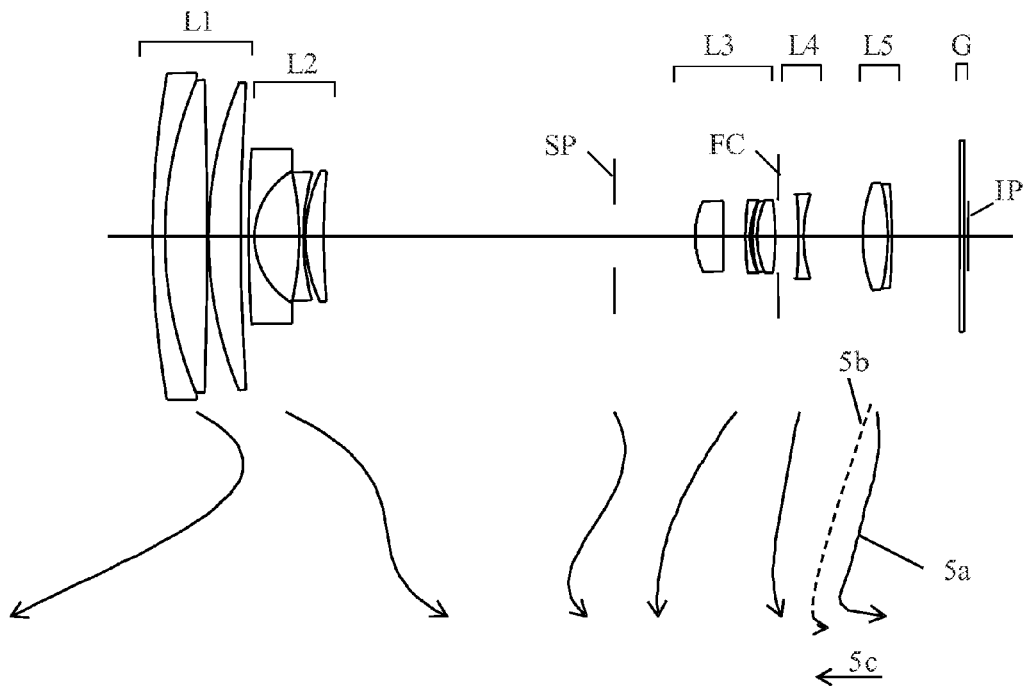
FIG. 11 is a sectional view at a wide-angle end of a zoom lens according to a sixth embodiment.
Figure 12A:
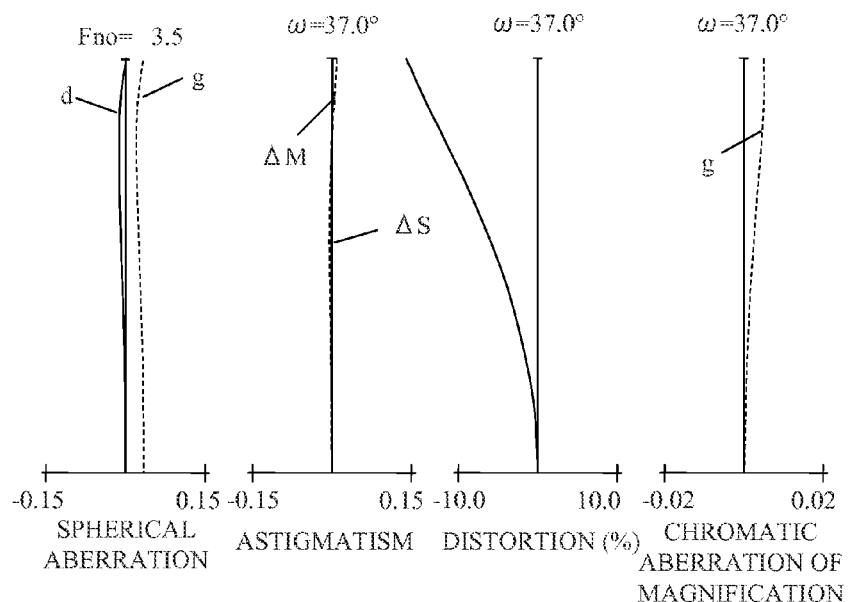
FIGS. 12A, 12B and 12C are aberration diagrams at a wide-angle end, a middle of zoom position, and a telephoto end of the zoom lens according to the sixth embodiment.
Figure 12B:
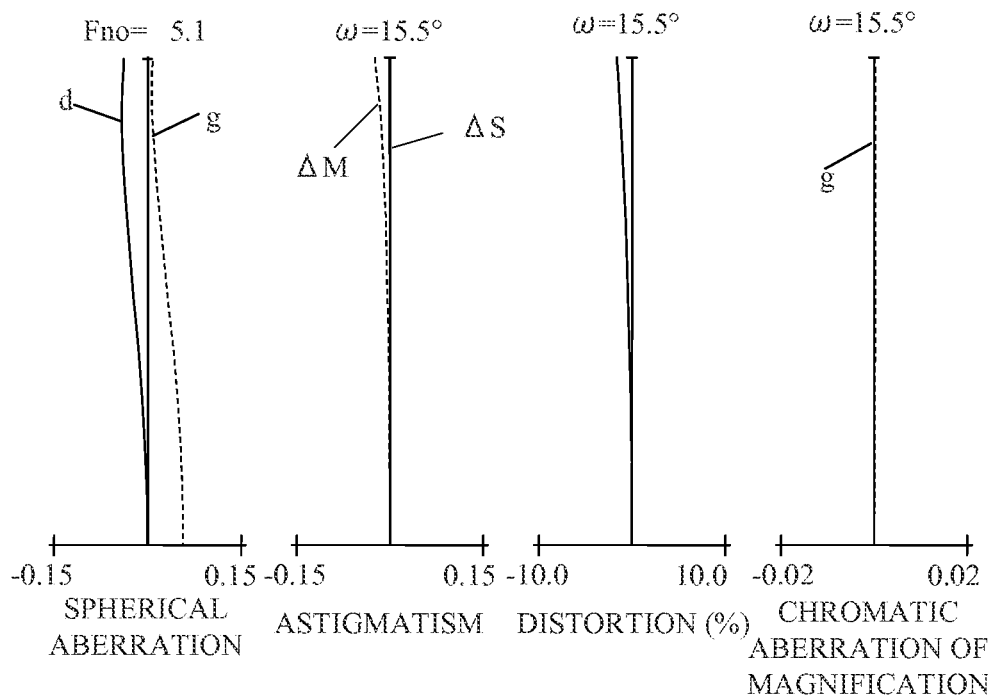
Figure 12C:
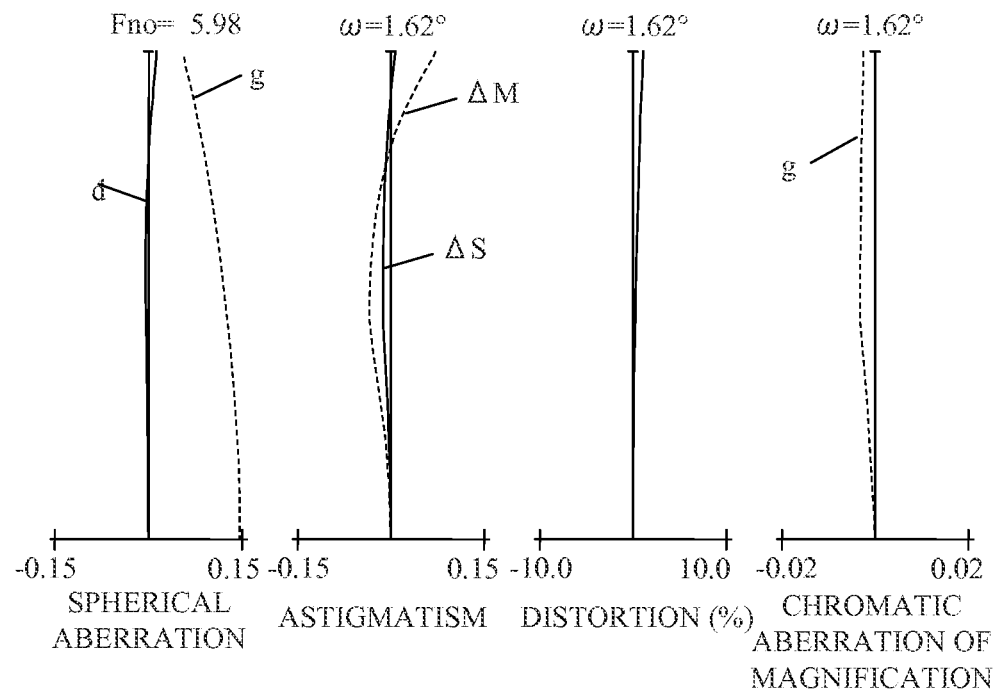

FIG. 9 is a sectional view at a wide-angle end of a zoom lens according to a fifth embodiment of the present invention. FIGS. 10A, 10B and 10C are aberration diagrams at a wide-angle end, a middle of zoom position, and a telephoto end of the zoom lens according to the fifth embodiment. FIG. 11 is a sectional view at a wide-angle end of a zoom lens according to a sixth embodiment of the present invention. FIGS. 12A, 12B and 12C are aberration diagrams at a wide-angle end, a middle of zoom position, and a telephoto end of the zoom lens according to the sixth embodiment.

Figure 13:
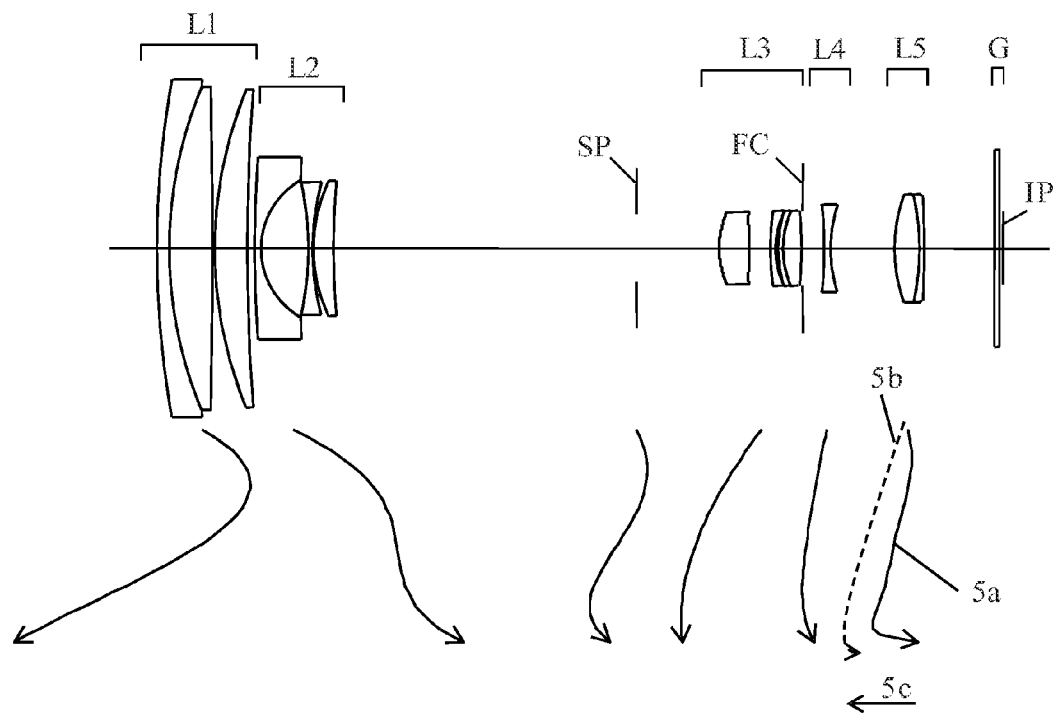
FIG. 13 is a sectional view at a wide-angle end of a zoom lens according to a seventh embodiment.
Figure 14A:
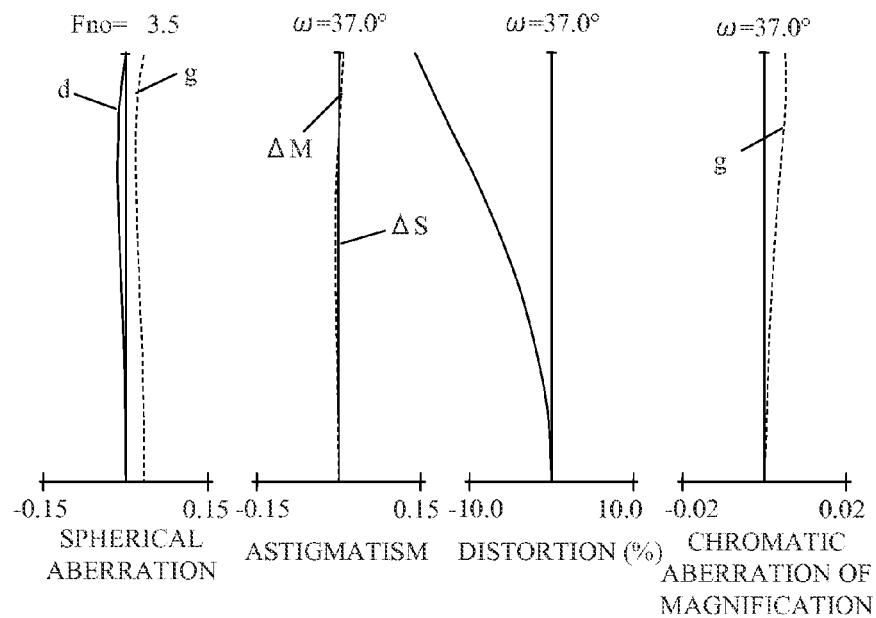
FIGS. 14A, 14B and 14C are aberration diagrams at a wide-angle end, a middle of zoom position, and a telephoto end of the zoom lens according to the seventh embodiment.
Figure 14B:
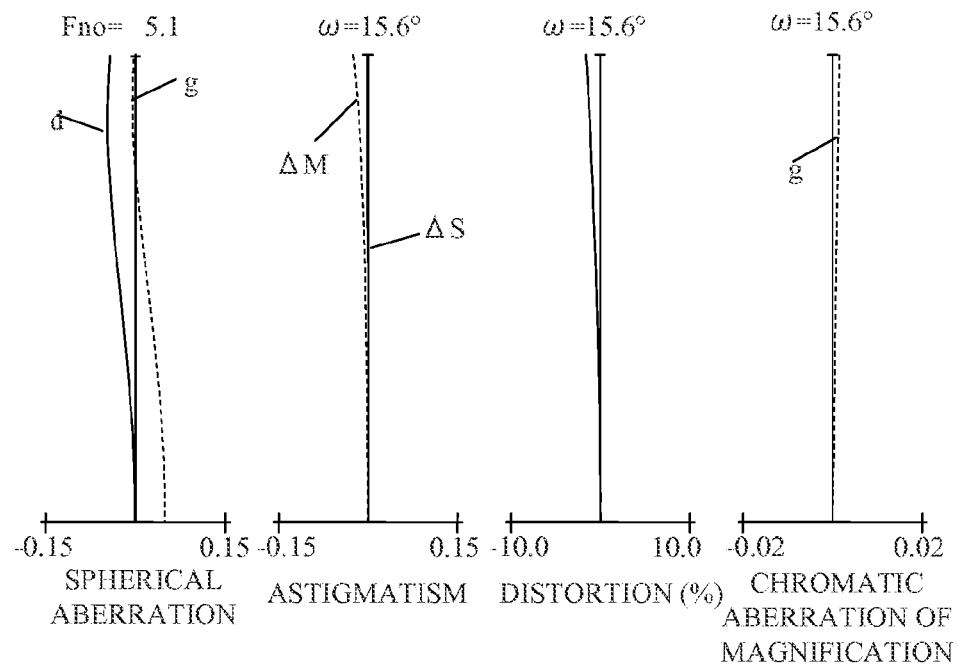
Figure 14C:
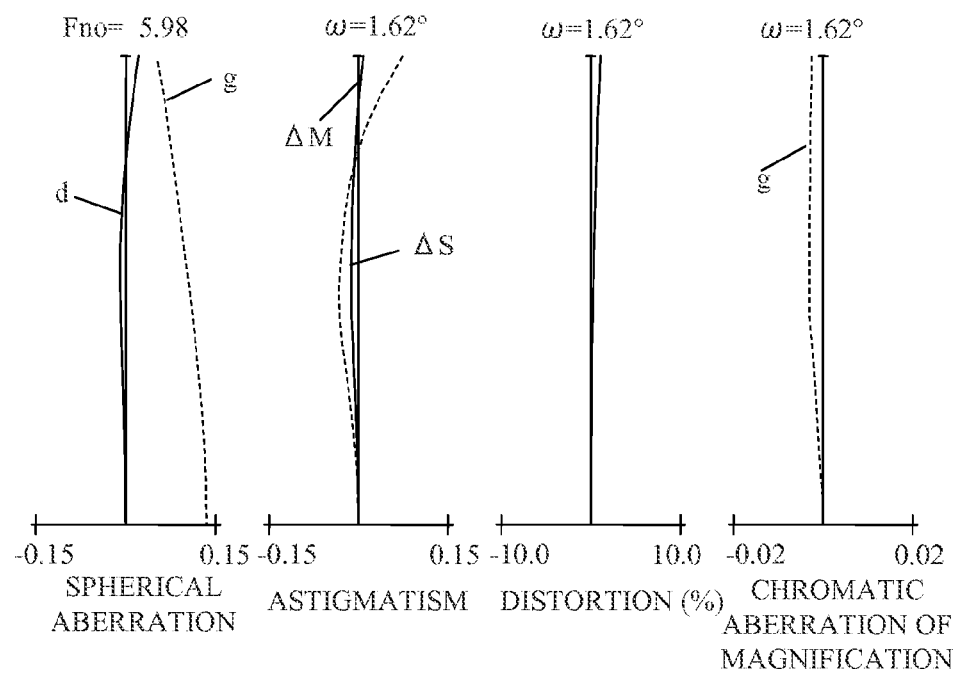
Figure 15A:
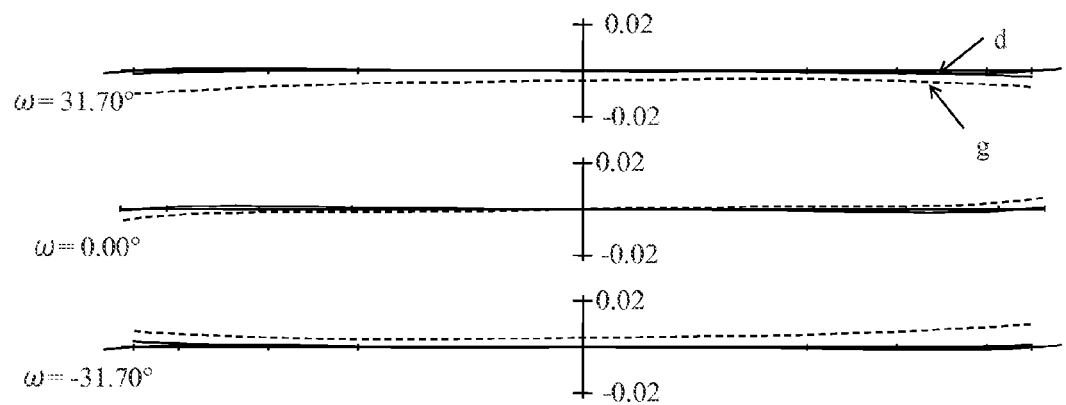
FIGS. 15A and 15B are lateral aberration diagrams at a wide-angle end and a telephoto end of the zoom lens according to the first embodiment.
Figure 15B:
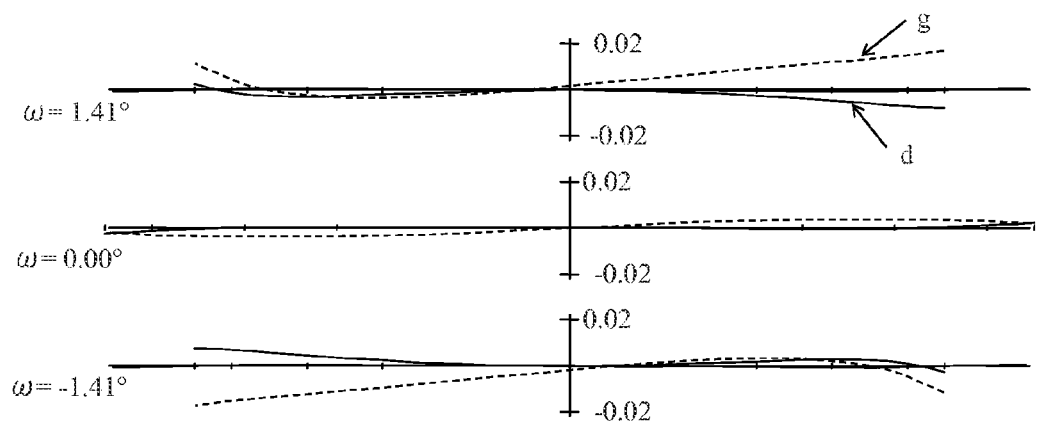
Figure 16A:
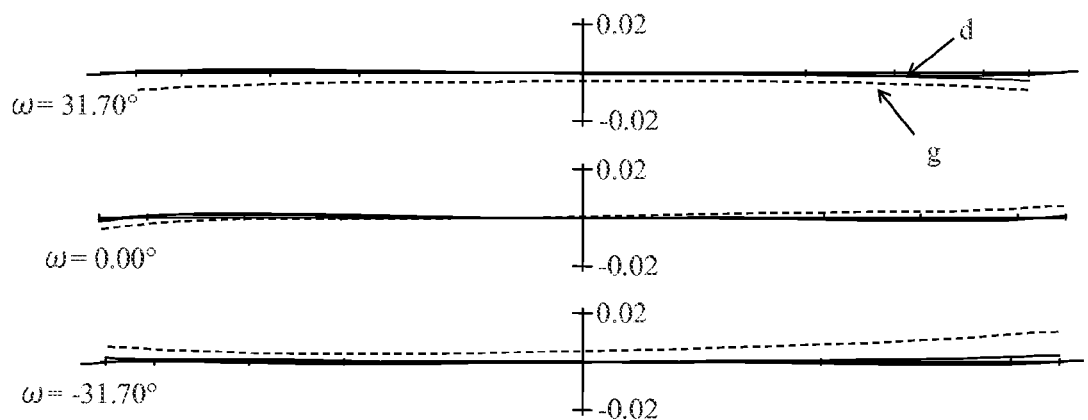
FIGS. 16A and 16B are lateral aberration diagrams in a state of performing a 0.3-degree image stabilizing shift at a wide-angle end and a telephoto end of the zoom lens according to the first embodiment.
Figure 16B:
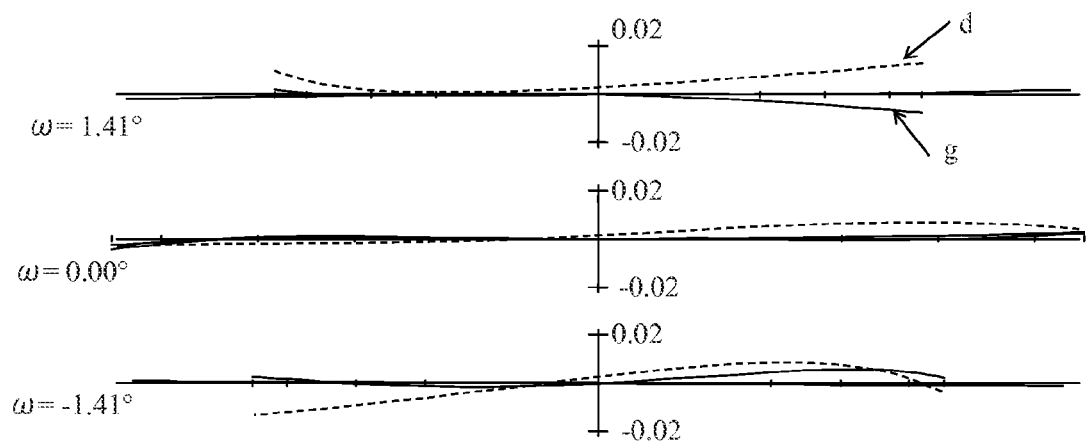
Figure 17:
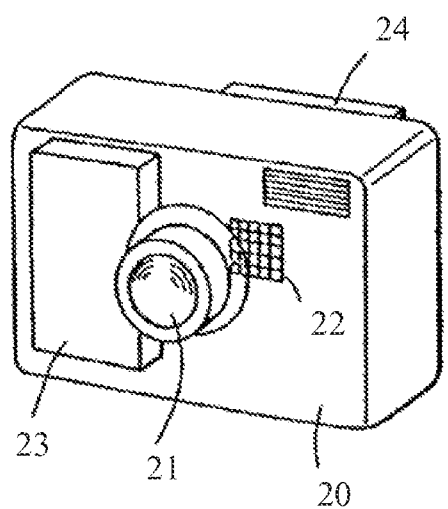
FIG. 17 is a schematic diagram of a main part as one example of the image-pickup apparatus.

FIG. 13 is a sectional view at a wide-angle end of a zoom lens according to a seventh embodiment of the present invention. FIGS. 14A, 14B and 14C are aberration diagrams at a wide-angle end, a middle of zoom position, and a telephoto end of the zoom lens according to the seventh embodiment. FIGS. 15A and 15B are lateral aberration diagrams at a wide-angle end and a telephoto end of the zoom lens according to the first embodiment of the present invention. FIGS. 16A and 16B are lateral aberration diagrams in a state of performing a 0.3-degree image stabilizing in the entire third lens unit at a wide-angle end and a telephoto end of the zoom lens according to the first embodiment. FIG. 17 is a schematic diagram of a main part of the image-pickup apparatus of the present invention.

The zoom lens of each embodiment is an image-pickup optical system used for an image-pickup apparatus such as a video camera, a digital camera, a security camera, and a broadcast camera. In the sectional view of the lens, the left side is an object side (a body side) (forward), and the right side is an image side (a rear side). At the sectional view of the lens, L1 denotes a first lens unit having a positive refractive power (an optical power=an inverse of focal length), L2 denotes a second lens unit having a negative refractive power, L3 denotes a third lens unit having a positive refractive power, L4 denotes a fourth lens unit having a negative lens power, and L5 denotes a fifth lens unit having a positive lens power.

In the sectional view of the lens, SP denotes an aperture stop deciding light flux of maximum aperture and is located on the object side of the third lens unit L3. FC denotes a flare-cut diaphragm. G denotes an optical block such as an optical filter and a face plate. IP denotes an image plane, corresponds to an image-pickup plane of a solid image-pickup element (a photoelectric conversion element) such as a CCD sensor and a CMOS sensor when using as an image-pickup optical system of a video camera and a digital camera, and corresponds to a film plane when using as an image-pickup optical system of a silver-halide film camera.

In the aberration diagrams, Fno denotes F number and ω denotes a half angle of view (degrees). A d-line (a solid line) and a g-line (a dotted line) are displayed in spherical aberration, a meridional image surface ΔM in the d-line and a sagittal image surface ΔS are displayed in astigmatism, a d-line is displayed in distortion, and an aberration of a g-line with respect to a d-line is displayed in chromatic aberration of magnification. A d-line is displayed in lateral aberration and lateral axis indicates a pupil diameter.

The arrow in the sectional-vies of the zoom lens indicates movement loci of the respective lens and the aperture stop, and a moving direction when focusing on from an infinite object to a close distance object is performed. In each embodiment, the wide-angle end and the telephoto end correspond to zoom positions at which the variable magnification lens unit reaches ends of its mechanical movable range on the optical axis.

In each embodiment, the first lens unit L1 moves to the object side along a locus concave as the arrow when zooming from the wide-angle end to the telephoto end is performed. The second lens unit L2 moves to the image side so as to perform the variation of magnification. The third lens unit L3 moves to the object side so as to perform she variation of magnification. Additionally, the fourth lens unit L4 moves to the object side so as to perform the variation of magnification. Additionally, the fifth lens unit L5 moves to the object side so as to correct variation of the image plane according to the variation of magnification.

In the sectional view of the zoom lens, the image plane IP indicates movement of she respective lens unit when the image plane IP does not move, but may indicate relative displacement wish respect to the image plane at the wide-angle end and the telephoto end. Additionally, the image plane IP may be moved. Additionally, rear focus type zoom lens focused by moving the fifth lens unit L5 on the optical axis is adopted. A solid curve line 5a and a dotted curve line 5b regarding the fifth lens unit L5 are respectively moving loci so as to correct variation of the image plane according to the variation of magnification when focusing on the infinite object and the close distance object is performed. Additionally, the fifth lens unit L5 moves forward as an arrow 5c so as to perform focusing from the infinite object to the close distance object at the wide-angle end.

A small zoom lens acquired high optical performance in the entire zoom range is achieved by the above configuration of each embodiment. Additionally, chromatic aberration of magnification and comatic aberration at the wide-angle end are well corrected with an attempt to perform high zoom ratio. Additionally, at the telephoto end compared with at the wide-angle end, an interval between the first lens unit L1 and the second lens unit L2 is longer, an interval between the second lens unit L2 and the third lens unit L3 is shorter, and an interval between the third lens unit L3 and the fourth lens unit L4 is longer. Further, an interval between the fourth lens unit L4 and the fifth lens unit L5 is longer. Therefore, the entire length of the zoom lens is controlled. Further, a front lens effective diameter is miniaturized.

When taking a picture, image blur of the image while the zoom lens vibrates may be corrected by moving the entire or a part of the third lens unit L3 or the entire fourth lens unit L4 so as to have a component of the perpendicular direction with respect to the optical axis. That is to say, image stabilizing may be performed.

The aperture stop SP moves along a locus different from the other lens units during zooming. The aperture stop SP may be moved along a locus convex toward the object side between the wide-angle end and the middle of zoom position, and be moved a locus concave toward the image side between the middle of zoom position and the telephoto end during zooming. The above movement can shorten the entire length of the zoom lens and miniaturize the front lens effective diameter since a space between the second lens unit L2 and the third lens unit L3 is used effectively.

In each embodiment, M2 and M4 respectively represent movement amounts of the second lens unit L2 and the fourth lens unit L4 during the zooming from the wide-angle end to the telephoto end. β2w and β2t respectively represent lateral magnifications of the second lens unit L2 at the wide-angle end and the telephoto end, fw and ft respectively represent focal lengths of the entire zoom lens at the wide-angle end and the telephoto end. Then, the following conditions are satisfied:

$$-16.0 < M2/M4 < -1.8 \quad (1)$$

$$0.2 < (\beta 2t/\beta 2w)/(ft/fw) < 0.5 \quad (2)$$

Here, movement amounts of the lens unit is the difference between the position on the optical axis of the lens unit at the wide-angle end and the position on the optical axis of the lens unit at the telephoto end, and a positive movement is the case that the lens unit is positioned on the object side at the telephoto end compared with the wide-angle end.

The condition (1) prescribes the ratio between movement amounts of the second lens unit L2 and movement amounts of the fourth lens unit L4 during zooming from the wide-angle end to the telescope end. When the absolute value of movement amounts of the second lens unit. L2 becomes lower beyond the upper limit of the condition (1), the amount of interval change between the third lens unit L3 and the second lens unit L4 decreases too much during zooming from the wide-angle end to the telephoto end. Therefore, the refractive power of the second lens unit L2 need to be strong so as to achieve high zoom ratio.

Then, since astigmatism at the wide-angle end increases, it is difficult to correct astigmatism. Or, since the absolute value of movement amounts of the fourth lens unit L4 becomes bigger and the amount of interval change between the third lens unit L3 and the fourth lens unit L4 increases too much, it is difficult to suppress the increase of the entire length of the zoom lens at the telephoto end and achieve high zoom ratio.

Moreover, when the absolute value of movement amounts of the beyond the lower limit, the amount of interval change between the third lens unit L3 and the second lens unit L2 increases too much and the interval between the second lens unit L2 and the third lens unit L3 becomes wide. Then, it is difficult to suppress the increase of the front lens effective-diameter and achieve high zoom ratio. Or, it is difficult to avoid the interference with the fifth lens unit L5 since the absolute value of the fourth lens unit L4 becomes lower, and the amount of interval change between the third lens unit L3 and the fourth lens unit L4 decreases too much.

The condition (2) prescribes the magnification ratio of the second lens unit L2 and she focal length ratio of the entire zoom lens at the wide-angle end and the telephoto end during zooming from the wide-angle end to the telephoto end. If these values exceed the upper limit of the condition (2), the magnification ratio of the second lens unit L2 becomes bigger, chromatic aberration of magnification, axial chromatic aberration, and spherical aberration at the telephoto end increase, and it is difficult to correct these aberrations. Additionally, these values exceed the lower limit of the condition (2), the magnification burden becomes bigger too much so as to achieve high zoom ratio, comatic aberration and field curvature increase in the entire zoom lens, and it is difficult to correct these aberrations.

As described above, relative movement amounts of the fourth lens unit L4 with respect to the second lens unit L2, the magnification ratio of the second lens unit L2 and the focal length ratio of the entire zoom lens are set appropriately in this embodiment. Therefore, especially, the entire length of the zoom lens at the telephoto end is suppressed and high zoom ratio is easily achieved.

In the zoom lens of the present invention, it is desirable to satisfy a plurality of the following conditions so as to obtain high optical performance maintaining high zoom ratio and the miniaturization of the zoom lens. M1 represents movement amounts of the first lens unit L1 during zooming from the wide-angle end to the telephoto end. f1, f2 and f4 respectively represent focal lengths of the first lens unit L1, the second lens unit L2 and the fourth lens unit L4. es2w and es2t respectively represent position sensitivities in the optical axis direction with respect to the image plane of the second lens unit L2 at the wide-angle end and the telephoto end. es4w and es4t respectively represent position sensitivities in the optical axis direction with respect to the image plane of the fourth lens unit L4 at the wide-angle end and the telephoto end.

The definition of positional sensitivity is as follows. ΔL at represents movement amounts in the optical axis direction of an i-th lens unit (movement amounts to the image side is set to positive) and then, ΔI represent movement amounts of imaging position at an image plane (movement amount to the image side is set to positive) when focusing on the infinite object. Then, positional sensitivity ESi of the i-th lens unit is assumed to be ESi=ΔI/ΔL. At this time, a plurality of following conditions may be satisfied.

$$-1.1 < M2/M1 < -0.4 \quad (3)$$

$$-4.7 < f1/f4 < -2.6 \quad (4)$$

$$-15.8 < (es2t/es2w)/(es4t/es4w) < -4.5 \quad (5)$$

$$6.5 < |f1/f2| < 10.0 \quad (6)$$

$$0.3 < f2/f4 < 0.6 \quad (7)$$

Next, the technical meaning of the above-mentioned each condition is described.

The condition (3) prescribes the ratio between movement amounts of the second lens unit L2 and movement amounts the first lens unit L1 during zooming from the wide-angle end to the telephoto end. When the absolute value of movement amounts of the second lens unit L2 becomes lower beyond the upper limit of the condition (3), the amount of interval change between the third lens unit L3 and the second lens unit L2 decreases too much during zooming from the wide-angle end to the telephoto end. As a result, it is difficult to correct field curvature since field curvature increases.

Or, she absolute value of movement amounts of the first lens unit L1 becomes higher, the amount of interval change between the second lens unit L2 and the first lens unit L1 increases too much, and it is difficult to achieve high zoom ratio suppressing the increase of the entire length of the zoom lens at the wide-angle end. Additionally, when the absolute value of movement amounts of the second lens unit L2 becomes higher beyond the lower limit, it is difficult to achieve high zoom ratio suppressing the increase of the front lens effective diameter since the amount of interval, change between the third lens unit L3 and the second lens unit L2 increases too much. Or, the amount of interval change between the second lens unit L2 and the first lens unit L1 decreases too much since the absolute value of movement amounts of the first lens unit L1 becomes lower.

As a result, the refractive power of the first lens unit L1 need to be strong so as to achieve high zoom ratio. Then, since axial chromatic aberration and chromatic aberration of magnification increase at the wide-angle end, it is difficult to correct these aberrations. And, since the amount of change of the distance between the other lens units and the third lens unit L3 is needed to increase so as to achieve high zoom ratio, it is difficult to correct aberrations in the entire zoom lens.

The condition (4) prescribes the ratio between the focal length of the first lens unit L1 and the focal length of the fourth lens unit L4 during zooming from the wide-angle end to the telephoto end. When the absolute value of movement amounts of the second lens unit L2 exceeds the lower limit of the condition (4), it is difficult to achieve high zoom ratio suppressing the increase of the entire length of the zoom lens at the telephoto end since the focal length of the first lens unit L1 increases too much. Or, the absolute value of the focal length of the fourth lens unit L4 becomes lower, comatic aberration and chromatic aberration of magnification increase at the wide-angle end, and it is difficult to correct these aberrations.

Moreover, when the upper limit is exceeded, the focal length of the first lens unit L1 becomes lower, spherical aberration, chromatic aberration magnification, and axial chromatic aberration increase at the telephoto end, and it is difficult to correct these aberrations. Or, since the absolute value of the focal length of the fourth lens unit L4 becomes higher, magnification effect after the fourth lens unit L4 becomes lower, and the entire length of the zoom lens increases at the telephoto end, it is difficult to achieve high zoom ratio suppressing the increase of the entire length of the zoom lens.

The condition (5) prescribes the ratio between the position sensitivity of the second lens unit L2 and the position sensitivity of the fourth lens unit L4. If the upper limit of the condition (5) is exceeded, the ratio of the position sensitivity of the second lens unit L2 becomes lower too much. As a result, other lens units are needed to become stronger so as to acquire high zoom ratio, then, field curvature and spherical aberration increase at the wide-angle end and it is difficult to correct these aberrations. Or, the ratio of the position sensitivity of the fourth lens unit. L4 becomes higher too much. As a result, the lateral magnification of the fourth lens unit L4 becomes lower, comatic aberration and chromatic aberration of magnification increase at the wide-angle end, and it is difficult to correct these aberrations.

Moreover, when the lower limit is exceeded, the ratio of the positional, sensitivity of the second lens unit L2 becomes higher too much. As a result, it is difficult to miniaturize the entire system of the zoom lens since movement amounts of the fifth lens unit L5 become large too much when variation of the image plane is corrected according to the variation of magnification. Or, the ratio of position sensitivity of the fourth lens unit L4 becomes small too much. Therefore, lateral magnification of the fourth lens unit L4 becomes large, movement amounts of other lens units becomes large so as to acquire high zoom ratio, and the entire length of the zoom lens increases.

The condition (6) prescribes the ratio between the focal length of the first lens unit L1 and the focal length of the second lens unit L2. If the upper limit of the condition (6) is exceeded, the focal length of the first lens unit L1 becomes large too much, and it is difficult to achieve high zoom ratio suppressing the entire length of the zoom lens as she telephoto end. Or, the absolute value of the focal length of the second lens unit L2 becomes lower too much, field curvature, chromatic aberration of magnification and comatic aberration increase in she entire zoom lens, and it is difficult to correct these aberrations.

Moreover, when the lower limit is exceeded, the focal length of she first lens unit L1 becomes lower too much, aberrations such as spherical aberration, chromatic aberration of magnification and chromatic aberration of magnifications increase, and it is difficult to correct these aberrations. Or, the absolute value of the focal length of the second lens unit L2 become higher too much, it is difficult to achieve high zoom ratio suppressing the increase of the entire length of the zoom lens in the entire zoom lens.

The condition (7) prescribes the ratio between the focal length of the second lens unit L2 and the focal length of the fourth lens unit L4 during zooming from the wide-angle end to the telephoto end. When the absolute value exceeds the upper limit of the condition (7), it is difficult to achieve high zoom ratio suppressing the increase of the entire length of the zoom lens at the telephoto end since the focal length of the second lens unit L2 increases too much. Or, the absolute value of the focal length of the fourth lens unit L4 becomes lower too much, comatic aberration and chromatic aberration of magnification increase at the wide-angle end, and it is difficult to correct these aberrations.

Moreover, when the lower limit, is exceeded, the absolute value of the focal length of the second lens unit L2 becomes lower too much, aberrations such as field curvature, chromatic aberration of magnification, and chromatic aberration of magnification, and axial chromatic aberration increase in the entire length of the zoom lens, and it is difficult to correct these aberrations. Or, since the absolute value of the focal length of the fourth lens unit L4 becomes higher, magnification effect after the fourth lens unit L4 becomes higher too much, and it is difficult to achieve high zoom ratio suppressing the increase of the entire length of the zoom lens. The numerical range of the conditions is highly preferred to set as follows.

$$-14.9 < M2/M4 < -2.0 \quad (1a)$$

$$0.22 < (\beta 2t/\beta 2w)/(ft/fw) < 0.45 \quad (2a)$$

$$-1.00 < M2/M1 < -0.45 \quad (3a)$$

$$-4.4 < f1/f4 < -2.8 \quad (4a)$$

$$-14.7 < (es2t/es2w)/(es4t/es4w) < -5.0 \quad (5a)$$

$$7.1 < |f1/f2| < 9.3 \quad (6a)$$

$$0.34 < f2/f4 < 0.55 \quad (7a)$$

Conditions (1a)-(7a) are highly preferred to set as follows.

$$-13.7 < M2/M4 < -2.2 \quad (1b)$$

$$0.24 < (\beta 2t/\beta 2w)/(ft/fw) < 0.43 \quad (2b)$$

$$-0.91 < M2/M1 < -0.50 \quad (3b)$$

$$-4.0 < f1/f4 < -3.1 \quad (4b)$$

$$-13.6 < (es2t/es2w)(es4t/es4w) < -5.5 \quad (5b)$$

$$7.8 < |f1/f2| < 8.5 \quad (6b)$$

$$0.38 < f2/f4 < 0.50 \quad (7b)$$

Each embodiment can easily acquire the zoom lens which achieves high zoom ratio 20-40 suppressing the increase of the entire length of the zoom lens at the telephoto end, preferably corrects chromatic aberration and field curvature in the entire zoom lens from the wide-angle end to the telephoto end, and has high optical performance. The aperture stop SP may be moved along a locus different from other lens units when zooming from the wide-angle end to the telephoto end is performed. Zooming is performed by moving each lens unit so as to increase the entire length of the zoom lens at the telephoto end compared with the wide-angle end.

In embodiment 1, image stabilizing is performed in the entire third lens unit L3. In this case, as illustrated in the aberration diagrams illustrated in FIGS. 16A and 16B, aberration correction is appropriately performed even when the image stabilization is performed by 0.3 degree with respect to the aberration diagrams of the standard state illustrated in FIGS. 15A and 15B where the image stabilization is not performed.

Further, the zoom lens in each embodiment, distortion and chromatic aberration of magnification in aberrations may be corrected by electric image processing. In addition, aspheric surface may be used for the third lens unit L3, and as a result, it is easy to correct spherical aberration in the entire zoom lens preferably. It is preferred to configure that the third lens unit L3 comprises a positive lens, a negative lens, a negative lens, and a positive lens, in order from the object side to the image side, the fourth lens unit L4 comprises a negative lens whose planes are concave shape, and the fifth lens unit L5 comprises a cemented lens that is formed by bonding a positive lens and a negative lens. As a result, it is easy to acquire high optical performance in the entire zoom lens.

Next, the embodiment of the digital still camera that uses the zoom lens of the present invention as an image-pickup optical system is described by using FIG. 17. In FIG. 17, reference numeral 20 denotes a camera body, and reference numeral 21 denotes an image-pickup optical system configured by one of the zoom lenses explained in the embodiments 1-7. Reference numeral 22 denotes a solid-state image-pickup element (a photoelectric conversion element) housed in the camera body such as a CCD sensor and a CMOS sensor which receive the object image formed by the image-pickup optical system 21. Reference numeral 23 denotes a memory recording information corresponding to the object image electrically converted by the solid-state image-pickup element 22. Reference numeral 24 denotes a finder which is configured by a liquid crystal panel so as to observe the object image formed on the solid-state image-pickup element 22.

The present invention can be also applied to a video camera (an image-pickup apparatus) using a zoom lens of the present invention as an image-pickup optical system. An image-pickup apparatus being small and having high optical performance is achieved since the zoom lens of the present invention is applied to an image-pickup apparatus such as a digital still camera and a video camera.

Next, numerical examples of the present invention respectively correspond to embodiments. In each numerical example, i (=1, 2, 3, . . . ) represents an optical surface number counted from the object side. In each numerical example, ri represents a curvature radius of an i-th lens surface, di represents a surface interval of the i-th lens surface, and ndi and vdi respectively represent a refractive index and an Abbe number of a material of an optical element of the i-th lens relative to the d-line. A back focus (BF) represents a distance from a final plane (a glass block plane) to a paraxial image plane. The entire zoom lens length is a value added the back focus (BF) from a foreground of the zoom lens to the final plane.

In numerical examples, the last two planes are a plane of an optical block such as a filter and a faceplate. Additionally, an aspheric shape of a lens surface is expressed by the following expression where K represents an eccentricity, A6, A8, and A10 represent aspheric coefficients, and x represents a displacement in the optical axis direction at the Position which is at the height of H from the optical axis based on a surface top:

R represents a curvature radius. In addition, "e±Z" represents "×10±Z". Moreover, Table 1 indicates relation to the above-mentioned conditions in each numerical example. Half angle of view is acquired by light beam. An aspheric surface is indicated by adding * after a surface number. Table 1 indicates various numerical values of the above-described conditions in each numerical example.

Numerical Example 1 unit mm surface data

| surface number | r | d | nd | vd |
|---|---|---|---|---|
| 1 | 101.721 | 1.30 | 1.80610 | 33.3 |
| 2 | 44.521 | 4.58 | 1.49700 | 81.5 |
| 3 | −554.834 | 0.18 | | |
| 4 | 43.808 | 3.44 | 1.60311 | 60.6 |
| 5 | 224.609 | (variable) | | |
| 6 | 132.874 | 0.70 | 1.83481 | 42.7 |
| 7 | 8.358 | 4.65 | | |
| 8 | −32.14 | 0.55 | 1.77250 | 49.6 |
| 9 | 26.500 | 0.20 | | |
| 10 | 16.536 | 1.99 | 1.92286 | 18.9 |
| 11 | 79.590 | (variable) | | |
| 12 (diaphragm) | ∞ | (variable) | | |
| 13* | 9.519 | 3.03 | 1.55332 | 71.7 |
| 14* | −67.520 | 2.30 | | |
| 15 | 24.912 | 0.55 | 1.64769 | 33.8 |
| 16 | 8.916 | 0.28 | | |
| 17 | 12.394 | 0.50 | 1.84666 | 23.9 |
| 18 | 9.266 | 1.90 | 1.51633 | 64.1 |
| 19 | −29.706 | (variable) | | |
| 20 | −39.092 | 0.70 | 1.48749 | 70.2 |
| 21 | 12.666 | (variable) | | |
| 22 | 17.121 | 2.88 | 1.83481 | 42.7 |
| 23 | −22.608 | 0.45 | 1.94595 | 18.0 |
| 24 | −64.627 | (variable) | | |
| 25 | ∞ | 0.60 | 1.51633 | 64.1 |
| 26 | ∞ | | | |

Aspheric data

Thirteenth surface

K = −1.78888e−001     A4 = −4.01546e−006
A6 = 1.73083e−006     A8 = 1.75668e−008
A10 = 2.62605e−010

Fourteenth surface

K = −6.67199e+001     A4 = 1.27460e−004
A6 = 3.44802e−006

-continued unit mm

Various data
Zoom ratio 28.51

| | wide angle | intermediate | telephoto |
|---|---|---|---|
| Focal length | 4.42 | 15.43 | 125.99 |
| Fno | 3.50 | 5.10 | 5.98 |
| Half angle Of view (°) | 37.01 | 14.09 | 1.76 |
| Image Height | 3.33 | 3.88 | 3.88 |
| Lens overall Length | 85.36 | 83.81 | 119.36 |
| BF | 1.01 | 1.01 | 1.01 |
| d5 | 0.78 | 15.73 | 56.38 |
| d11 | 29.71 | 10.30 | 0.93 |
| d12 | 8.90 | 1.10 | 0.51 |
| d19 | 2.45 | 8.77 | 10.93 |
| d21 | 4.70 | 5.47 | 12.64 |
| d24 | 7.03 | 10.65 | 6.16 | zoom lens unit data

| Unit | starting surface | focal length |
|---|---|---|
| 1 | 1 | 77.05 |
| 2 | 6 | −9.51 |
| 3 | 12 | 14.87 |
| 4 | 20 | −19.54 |
| 5 | 22 | 17.37 |

Numerical Example 2 unit mm surface data

| surface number | r | d | nd | vd |
|---|---|---|---|---|
| 1 | 101.345 | 1.30 | 1.80610 | 33.3 |
| 2 | 44.493 | 4.42 | 1.49700 | 81.5 |
| 3 | −662.408 | 0.18 | | |
| 4 | 43.940 | 3.37 | 1.60311 | 60.6 |
| 5 | 226.909 | (variable) | | |
| 6 | 109.716 | 0.70 | 1.83481 | 42.7 |
| 7 | 8.246 | 4.77 | | |
| 8 | −30.746 | 0.55 | 1.77250 | 49.6 |
| 9 | 26.068 | 0.20 | | |
| 10 | 16.390 | 2.03 | 1.92286 | 18.9 |
| 11 | 80.095 | (variable) | | |
| 12 (diaphragm) | ∞ | (variable) | | |
| 13* | 9.541 | 2.97 | 1.55332 | 71.7 |
| 14* | −71.659 | 2.11 | | |
| 15 | 26.228 | 0.55 | 1.64769 | 33.8 |
| 16 | 8.806 | 0.28 | | |
| 17 | 12.440 | 0.50 | 1.84666 | 23.9 |
| 18 | 9.693 | 1.95 | 1.51633 | 64.1 |
| 19 | −29.718 | (variable) | | |
| 20 | −64.279 | 0.70 | 1.48749 | 70.2 |
| 21 | 13.344 | (variable) | | |
| 22 | 17.732 | 3.16 | 1.83481 | 42.7 |
| 23 | −23.651 | 0.45 | 1.94595 | 18.0 |
| 24 | −74.771 | (variable) | | |
| 25 | ∞ | 0.60 | 1.51633 | 64.1 |
| 26 | ∞ | | | |

Aspheric data

Thirteenth surface

K = −2.42569e−001    A4 = −1.78992e−005
A6 = 2.26841e−006    A8 = −3.93121e−008
A10 = 2.62605e−010

Fourteenth surface

K = 1.18875e+002    A4 = 1.72065e−004
A6 = 2.63700e−006

-continued unit mm

Various data
Zoom ratio 36.47

| | wide angle | intermediate | telephoto |
|---|---|---|---|
| Focal length | 4.28 | 15.18 | 155.93 |
| Fno | 3.50 | 5.10 | 5.98 |
| Half angle Of view (°) | 37.94 | 14.32 | 1.42 |
| Image Height | 3.33 | 3.88 | 3.88 |
| Lens overall Length | 85.60 | 83.92 | 123.07 |
| BF | 1.00 | 1.00 | 1.00 |
| d5 | 0.78 | 15.31 | 57.64 |
| d11 | 30.35 | 9.97 | 0.67 |
| d12 | 8.46 | 1.00 | 0.51 |
| d19 | 2.31 | 8.73 | 12.04 |
| d21 | 4.99 | 5.76 | 16.95 |
| d24 | 6.92 | 11.36 | 3.46 | zoom lens unit data

| Unit | starting surface | focal length |
|---|---|---|
| 1 | 1 | 77.86 |
| 2 | 6 | −9.38 |
| 3 | 12 | 15.14 |
| 4 | 20 | −22.60 |
| 5 | 22 | 18.43 |

Numerical Example 3 unit mm

Surface Data

| surface number | r | d | nd | vd |
|---|---|---|---|---|
| 1 | 102.155 | 1.30 | 1.80610 | 33.3 |
| 2 | 44.712 | 4.92 | 1.49700 | 81.5 |
| 3 | −552.910 | 0.18 | | |
| 4 | 44.175 | 3.67 | 1.60311 | 60.6 |
| 5 | 223.394 | (variable) | | |
| 6 | 136.499 | 0.70 | 1.83481 | 42.7 |
| 7 | 8.386 | 4.74 | | |
| 8 | −32.292 | 0.55 | 1.77250 | 49.6 |
| 9 | 26.098 | 0.20 | | |
| 10 | 16.566 | 2.36 | 1.92286 | 18.9 |
| 11 | 81.914 | (variable) | | |
| 12 (diaphragm) | ∞ | (variable) | | |
| 13* | 9.497 | 3.25 | 1.55332 | 71.7 |
| 14* | −95.401 | 2.44 | | |
| 15 | 25.133 | 0.55 | 1.64769 | 33.8 |
| 16 | 9.133 | 0.36 | | |
| 17 | 12.954 | 0.50 | 1.84666 | 23.9 |
| 18 | 9.567 | 1.97 | 1.51633 | 64.1 |
| 19 | −31.901 | (variable) | | |
| 20 | −38.028 | 0.70 | 1.48749 | 70.2 |
| 21 | 13.745 | (variable) | | |
| 22 | 17.082 | 3.24 | 1.83481 | 42.7 |
| 23 | −22.882 | 0.45 | 1.94595 | 18.0 |
| 24 | −66.240 | (variable) | | |
| 25 | ∞ | 0.60 | 1.51633 | 64.1 |
| 26 | ∞ | | | |

Aspheric data

Thirteenth surface

K = 2.69473e−002    A4 = −1.57053e−005
A6 = 2.32765e−006    A8 = 4.83450e−008
A10 = 2.62605e−010

-continued unit mm

Fourteenth surface

K = 4.54378e+001  A4 = 1.76439e−001
A6 = 5.61840e−006

Various data
Zoom ratio 31.50

|  | wide angle | intermediate | telephoto |
|---|---|---|---|
| Focal length | 4.42 | 14.01 | 139.23 |
| Fno | 3.50 | 5.10 | 5.98 |
| Half angle Of view (°) | 37.01 | 15.46 | 1.59 |
| Image Height | 3.33 | 3.88 | 3.88 |
| Lens overall Length | 89.17 | 87.15 | 121.37 |
| BF | 0.77 | 0.77 | 0.77 |
| d5 | 0.78 | 14.91 | 58.04 |
| d11 | 31.14 | 12.87 | 0.49 |
| d12 | 8.98 | 1.01 | 0.51 |
| d19 | 2.52 | 8.96 | 11.20 |
| d21 | 5.01 | 6.06 | 11.48 |
| d24 | 7.29 | 9.89 | 6.16 | zoom lens unit data

| Unit | starting surface | focal length |
|---|---|---|
| 1 | 1 | 77.80 |
| 2 | 6 | −9.49 |
| 3 | 12 | 15.61 |
| 4 | 20 | −20.62 |
| 5 | 22 | 17.44 |

Numerical Example 4 unit mm surface data

| surface number | r | d | nd | vd |
|---|---|---|---|---|
| 1 | 97.666 | 1.30 | 1.80610 | 33.3 |
| 2 | 45.645 | 5.82 | 1.49700 | 81.5 |
| 3 | −753.469 | 0.18 |  |  |
| 4 | 44.267 | 4.23 | 1.60311 | 60.6 |
| 5 | 169.632 | (variable) |  |  |
| 6 | 74.581 | 0.70 | 1.83481 | 42.7 |
| 7 | 8.461 | 5.55 |  |  |
| 8 | −31.973 | 0.55 | 1.77250 | 49.6 |
| 9 | 26.091 | 0.20 |  |  |
| 10 | 17.445 | 2.15 | 1.92286 | 18.9 |
| 11 | 94.135 | (variable) |  |  |
| 12 (diaphragm) | ∞ | (variable) |  |  |
| 13* | 9.546 | 3.03 | 1.55332 | 71.7 |
| 14* | −131.855 | 2.50 |  |  |
| 15 | 24.580 | 0.55 | 1.64769 | 33.8 |
| 16 | 9.271 | 0.33 |  |  |
| 17 | 13.889 | 0.50 | 1.84666 | 23.9 |
| 18 | 9.931 | 1.96 | 1.51633 | 64.1 |
| 19 | −32.770 | (variable) |  |  |
| 20 | −41.168 | 0.70 | 1.48749 | 70.2 |
| 21 | 17.486 | (variable) |  |  |
| 22 | 18.316 | 2.36 | 1.83481 | 42.7 |
| 23 | −29.617 | 0.45 | 1.94595 | 18.0 |
| 24 | −94.215 | (variable) |  |  |
| 25 | ∞ | 0.60 | 1.51633 | 64.1 |
| 26 | ∞ |  |  |  |

-continued unit mm

Aspheric data

Thirteenth surface

K = 1.18186e−001  A4 = −2.29486e−005
A6 = 9.60724e−007  A8 = 1.57010e−007
A10 = 2.62605e−010

Fourteenth surface

K = 4.55788e+002  A4 = 1.91119e−004
A6 = 4.23256e−006  A8 = 1.38735e−007

Various data
Zoom ratio 35.25

|  | wide angle | intermediate | telephoto |
|---|---|---|---|
| Focal length | 4.33 | 14.13 | 152.52 |
| Fno | 3.50 | 5.10 | 5.98 |
| Half angle Of view (°) | 37.60 | 15.3 | 1.46 |
| Image Height | 3.33 | 3.88 | 3.88 |
| Lens overall Length | 91.83 | 89.69 | 125.50 |
| BF | 0.53 | 0.53 | 0.53 |
| d5 | 0.78 | 15.56 | 61.89 |
| d11 | 32.35 | 13.63 | 1.12 |
| d12 | 9.80 | 1.04 | 0.51 |
| d19 | 2.69 | 9.67 | 7.43 |
| d21 | 3.78 | 5.19 | 14.18 |
| d24 | 8.24 | 10.41 | 6.17 | zoom lens unit data

| Unit | starting surface | focal length |
|---|---|---|
| 1 | 1 | 81.52 |
| 2 | 6 | −9.82 |
| 3 | 12 | 16.34 |
| 4 | 20 | −25.08 |
| 5 | 22 | 19.46 |

Numerical Example 5 unit mm surface data

| surface number | r | d | nd | vd |
|---|---|---|---|---|
| 1 | 101.746 | 1.30 | 1.80610 | 33.3 |
| 2 | 44.631 | 4.67 | 1.49700 | 81.5 |
| 3 | −548.753 | 0.18 |  |  |
| 4 | 44.214 | 3.53 | 1.60311 | 60.6 |
| 5 | 224.141 | (variable) |  |  |
| 6 | 129.574 | 0.70 | 1.83481 | 42.7 |
| 7 | 8.389 | 4.81 |  |  |
| 8 | −31.707 | 0.55 | 1.77250 | 49.6 |
| 9 | 25.971 | 0.20 |  |  |
| 10 | 16.564 | 2.07 | 1.92286 | 18.9 |
| 11 | 81.904 | (variable) |  |  |
| 12 (diaphragm) | ∞ | (variable) |  |  |
| 13* | 9.527 | 3.15 | 1.55332 | 71.7 |
| 14* | −97.262 | 2.37 |  |  |
| 15 | 25.154 | 0.55 | 1.64769 | 33.8 |
| 16 | 9.108 | 0.29 |  |  |
| 17 | 12.859 | 0.50 | 1.84666 | 23.9 |
| 18 | 9.599 | 1.91 | 1.51633 | 64.1 |
| 19 | −32.721 | (variable) |  |  |
| 20 | −43.951 | 0.70 | 1.48749 | 70.2 |
| 21 | 13.977 | (variable) |  |  |
| 22 | 16.862 | 2.64 | 1.83481 | 42.7 |
| 23 | −24.481 | 0.45 | 1.94595 | 18.0 |
| 24 | −77.267 | (variable) |  |  |

-continued unit mm

| | | | | |
|---|---|---|---|---|
| 25 | ∞ | 0.60 | 1.51633 | 64.1 |
| 26 | ∞ | | | |

Aspheric data

Thirteenth surface

K = 3.66103e−002  A4 = −1.78814e−005
A6 = 3.37557e−006  A8 = 1.32227e−008
A10 = 2.62605e−010

Fourteenth surface

K = 4.79111e+001  A4 = 1.76302e−004
A6 = 5.92890e−006

Various data
Zoom ratio 31.13

| | wide angle | intermediate | telephoto |
|---|---|---|---|
| Focal length | 4.41 | 13.88 | 137.37 |
| Fno | 3.50 | 5.10 | 5.98 |
| Half angle Of view (°) | 37.06 | 15.60 | 1.62 |
| Image Height | 3.33 | 3.88 | 3.88 |
| Lens overall Length | 89.24 | 86.90 | 120.53 |
| BF | 0.49 | 0.49 | 0.49 |
| d5 | 0.78 | 14.60 | 57.95 |
| d11 | 31.67 | 13.43 | 0.92 |
| d12 | 8.90 | 1.00 | 0.51 |
| d19 | 2.48 | 9.30 | 11.75 |
| d21 | 6.16 | 7.30 | 11.60 |
| d24 | 7.58 | 9.61 | 6.16 | zoom lens unit data

| Unit | starting surface | focal length |
|---|---|---|
| 1 | 1 | 77.68 |
| 2 | 6 | −9.46 |
| 3 | 12 | 15.63 |
| 4 | 20 | −21.67 |
| 5 | 22 | 17.69 |

Numerical Example 6 unit mm surface data

| surface number | r | d | nd | vd |
|---|---|---|---|---|
| 1 | 101.828 | 1.30 | 1.80610 | 33.3 |
| 2 | 44.651 | 4.67 | 1.49700 | 81.5 |
| 3 | −544.759 | 0.18 | | |
| 4 | 44.221 | 3.53 | 1.60311 | 60.6 |
| 5 | 223.997 | (variable) | | |
| 6 | 130.037 | 0.70 | 1.83481 | 42.7 |
| 7 | 8.388 | 4.82 | | |
| 8 | −31.438 | 0.55 | 1.77250 | 49.6 |
| 9 | 26.043 | 0.20 | | |
| 10 | 16.571 | 2.07 | 1.92286 | 18.9 |
| 11 | 81.582 | (variable) | | |
| 12 (diaphragm) | ∞ | (variable) | | |
| 13* | 9.527 | 3.13 | 1.55332 | 71.7 |
| 14* | −100.156 | 2.38 | | |
| 15 | 25.317 | 0.55 | 1.64769 | 33.8 |
| 16 | 9.112 | 0.30 | | |
| 17 | 12.844 | 0.50 | 1.84666 | 23.9 |
| 18 | 9.629 | 1.88 | 1.51633 | 64.1 |
| 19 | −33.803 | (variable) | | |
| 20 | −46.756 | 0.70 | 1.48749 | 70.2 |
| 21 | 14.142 | (variable) | | |

-continued unit mm

| | | | | |
|---|---|---|---|---|
| 22 | 16.794 | 2.60 | 1.83481 | 42.7 |
| 23 | −25.067 | 0.45 | 1.94595 | 18.0 |
| 24 | −82.741 | (variable) | | |
| 25 | ∞ | 0.60 | 1.51633 | 64.1 |
| 26 | ∞ | | | |

Aspheric data

Thirteenth surface

K = 3.90568e−002  A4 = −1.68790e−005
A6 = 3.95543e−006  A8 = 2.36638e−009
A10 = 2.62605e−010

Fourteenth surface

K = 4.74952e+001  A4 = 1.77412e−004
A6 = 6.42921e−006

Various data
Zoom ratio 31.06

| | wide angle | intermediate | telephoto |
|---|---|---|---|
| Focal length | 4.42 | 13.98 | 137.30 |
| Fno | 3.50 | 5.10 | 5.98 |
| Half angle Of view (°) | 37.01 | 15.49 | 1.62 |
| Image Height | 3.33 | 3.88 | 3.88 |
| Lens overall Length | 89.85 | 88.17 | 120.45 |
| BF | 0.49 | 0.49 | 0.49 |
| d5 | 0.78 | 15.32 | 57.94 |
| d11 | 31.98 | 13.65 | 0.91 |
| d12 | 8.90 | 1.00 | 0.51 |
| d19 | 2.45 | 9.19 | 12.33 |
| d21 | 6.60 | 7.69 | 11.01 |
| d24 | 7.55 | 9.74 | 6.16 | zoom lens unit data

| Unit | starting surface | focal length |
|---|---|---|
| 1 | 1 | 77.68 |
| 2 | 6 | −9.43 |
| 3 | 12 | 15.73 |
| 4 | 20 | −22.19 |
| 5 | 22 | 17.83 |

Numerical Example 7 unit mm surface data

| surface number | r | d | nd | vd |
|---|---|---|---|---|
| 1 | 101.783 | 1.30 | 1.80610 | 33.3 |
| 2 | 44.621 | 4.67 | 1.49700 | 81.5 |
| 3 | −544.766 | 0.18 | | |
| 4 | 44.219 | 3.51 | 1.60311 | 60.6 |
| 5 | 223.767 | (variable) | | |
| 6 | 127.058 | 0.70 | 1.83481 | 42.7 |
| 7 | 8.386 | 4.85 | | |
| 8 | −31.378 | 0.55 | 1.77250 | 49.6 |
| 9 | 26.058 | 0.20 | | |
| 10 | 16.617 | 2.03 | 1.92286 | 18.9 |
| 11 | 81.570 | (variable) | | |
| 12 (diaphragm) | ∞ | (variable) | | |
| 13* | 9.528 | 3.15 | 1.55332 | 71.7 |
| 14* | −102.098 | 2.32 | | |
| 15 | 26.481 | 0.55 | 1.64769 | 33.8 |
| 16 | 9.087 | 0.27 | | |
| 17 | 12.849 | 0.50 | 1.84666 | 23.9 |
| 18 | 9.843 | 1.88 | 1.51633 | 61.1 |

-continued unit mm

| | | | | |
|---|---|---|---|---|
| 19 | −33.270 | (variable) | | |
| 20 | −46.713 | 0.70 | 1.48749 | 70.2 |
| 21 | 14.596 | (variable) | | |
| 22 | 16.706 | 2.55 | 1.83481 | 42.7 |
| 23 | −25.191 | 0.15 | 1.94595 | 18.0 |
| 24 | −91.271 | (variable) | | |
| 25 | ∞ | 0.60 | 1.51633 | 64.1 |
| 26 | ∞ | | | |

Aspheric data

Thirteenth surface

K = 3.79335e−002   A4 = −1.76663e−005
A6 = 3.61683e−006   A8 = 7.99749e−009
A10 = 2.62605e−010

Fourteenth surface

K = 5.97919e+001   A4 = 1.73589e−004
A6 = 6.21381e−006

Various data
Zoom ratio 31.03

| | wide angle | intermediate | telephoto |
|---|---|---|---|
| Focal length | 4.42 | 13.91 | 137.17 |
| Fno | 3.50 | 5.10 | 5.98 |
| Half angle Of view (°) | 37.01 | 15.57 | 1.62 |
| Image Height | 3.33 | 3.88 | 3.88 |
| Lens overall Length | 90.27 | 88.55 | 120.28 |
| BF | 0.46 | 0.46 | 0.46 |
| d5 | 0.78 | 15.26 | 57.94 |
| d11 | 32.34 | 13.95 | 0.88 |
| d12 | 8.78 | 1.02 | 0.51 |
| d19 | 2.45 | 9.31 | 12.99 |
| d21 | 6.87 | 7.93 | 10.38 |
| d24 | 7.63 | 9.66 | 6.16 | zoom lens unit data

| Unit | starting surface | focal length |
|---|---|---|
| 1 | 1 | 77.70 |
| 2 | 6 | −9.12 |
| 3 | 12 | 15.82 |
| 4 | 20 | −22.73 |
| 5 | 22 | 18.05 |

TABLE 1

Condition

| | | (1) M2/M4 | (2) (β2t/ β2w)/ (ft/fw) | (3) M2/M1 | (4) f1/f4 | (5) (es2t/ es2w)/ (es4t/ es4w) | (6) f1/|f2| | (7) f2/f4 |
|---|---|---|---|---|---|---|---|---|
| Embodiment | 1 | −3.053 | 0.309 | −0.636 | −3.944 | −5.669 | 8.100 | 0.487 |
| | 2 | −2.280 | 0.257 | −0.618 | −3.445 | −6.942 | 8.303 | 0.416 |
| | 3 | −4.703 | 0.337 | −0.780 | −3.773 | −9.952 | 8.197 | 0.460 |
| | 4 | −3.297 | 0.414 | −0.815 | −3.251 | −13.204 | 8.300 | 0.392 |
| | 5 | −6.447 | 0.333 | −0.827 | −3.586 | −9.578 | 8.213 | 0.487 |
| | 6 | −8.788 | 0.332 | −0.868 | −3.501 | −9.857 | 8.238 | 0.435 |
| | 7 | −13.305 | 0.330 | −0.965 | −3.419 | −10.119 | 8.253 | 0.414 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-176036, filed Aug. 8, 2012, which is hereby incorporated by reference herein in its entirety.

What is claimed is:

1. A zoom lens comprising in an order from an object side to an image side;
  a first lens unit having a positive refractive power;
  a second lens unit having a negative refractive power;
  a third lens unit having a positive refractive power;
  a fourth lens unit having a negative refractive power; and
  a fifth lens unit having a positive refractive power,
  wherein the first lens unit comprises a negative lens, a positive lens, and a positive lens in the order from the object side to the image side,
  wherein the second lens unit comprises a negative lens, a negative lens, and a positive lens in the order from the object side to the image side,
  wherein each lens unit moves during zooming so that a distance between the first lens unit and the second lens unit at a telephoto end is longer than the distance at a wide-angle end, a distance between the second lens unit and the third lens unit at the telephoto end is shorter than the distance at the wide-angle end, a distance between the third lens unit and the fourth lens unit at the telephoto end is longer than the distance at the wide-angle end, and a distance between the fourth lens unit and the fifth lens unit at the telephoto end is longer than the distance at the wide-angle end, and
  wherein the following conditions are satisfied:

$$-16.0 < M2/M4 < -1.8; \text{ and}$$

$$0.2 < (\beta 2t/\beta 2w)/(ft/fw) < 0.5,$$

where M2 and M4 respectively represent movement amounts of the second lens unit and the fourth lens unit during the zooming from the wide-angle end to the telephoto end, β2w and β2t respectively represent lateral magnifications of the second lens unit at the wide-angle end and the telephoto end, and fw and ft respectively represent focal lengths of an entire system at the wide-angle end and the telephoto end.

2. The zoom lens according to claim 1, wherein the following condition is satisfied:

$$-1.1 < M2/M1 < -0.4,$$

where M1 represents a movement amount of the first lens unit during the zooming from the wide-angle end to the telephoto end.

3. The zoom lens according to claim 1, wherein the following condition is satisfied:

$$-4.7 < f1/f4 < -2.6,$$

where f1 represents a focal length of the first lens unit and f4 represents a focal length of the fourth lens unit.

4. The zoom lens according to claim 1, wherein the following conditions are satisfied:

$$-15.8 < (es2t/es2w)/(es4t/es4w) < -4.5;$$

$$6.5 < f1/|f2| < 10.0; \text{ and}$$

$$0.3 < f2/f4 < 0.6,$$

where es2w and es2t respectively represent position sensitivities in an optical axis direction with respect to an image plane of the second lens unit at the wide-angle end and the telephoto end, es4w and es4t respectively represent position sensitivities in the optical axis direction with respect to an image plane of the fourth lens unit at the wide-angle end and the telephoto end, f1 represents a focal length of the first lens unit, f2 represents a focal length of the second lens unit, and f4 represents a focal length of the fourth lens unit.

5. The zoom lens according to claim 1, wherein the first lens unit moves along a locus concave toward the object side, the second lens unit moves to the image side, the third lens unit and the fourth lens unit move to the object side, and the fifth lens unit moves during the zooming from the wide-angle end to the telephoto end.

6. The zoom lens according to claim 1, further comprising an aperture stop placed between the second and third lens units,
wherein the aperture stop moves along a locus which is different from a locus of each of the lens units during the zooming from the wide-angle end to the telephoto end.

7. The zoom lens according to claim 1, wherein the third lens unit comprises a positive lens, a negative lens, a negative lens, and a positive lens, in the order from the object side to the image side,
wherein the fourth lens unit comprises a negative lens whose both planes are concave shape, and
wherein the fifth lens unit comprises a cemented lens that is formed by bonding a positive lens and a negative lens.

8. An image-pickup apparatus comprising:
a zoom lens; and
an image-pickup element configured to receive an image formed by the zoom lens,
wherein the zoom lens comprises, in an order from an object side to an image side, a first lens unit having a positive refractive power, a second lens unit having a negative refractive power, a third lens unit having a positive refractive power, a fourth lens unit having a negative refractive power, and a fifth lens unit having a positive refractive power,
wherein the first lens unit comprises a negative lens, a positive lens, and a positive lens in the order from the object side to the image side,
wherein the second lens unit comprises a negative lens, a negative lens, and a positive lens in the order from the object side to the image side,
wherein, each lens unit moves during zooming so that a distance between the first lens unit and the second lens unit at a telephoto end is longer than the distance at a wide-angle end, a distance between the second lens unit and the third lens unit at the telephoto end is shorter than the distance at the wide-angle end, a distance between the third lens unit and the fourth lens unit at the telephoto end is longer than the distance at the wide-angle end, and a distance between the fourth lens unit and the fifth lens unit at the telephoto end is longer than the distance at the wide-angle end, and
wherein the following conditions are satisfied:

$-16.0 < M2/M4 < -1.8$; and $0.2 < (\beta 2t/\beta 2w)/(ft/fw) < 0.5$, where M2 and M4 respectively represent movement amounts of the second lens unit and the fourth lens unit during the zooming from the wide-angle end to the telephoto end, $\beta 2w$ and $\beta 2t$ respectively represent lateral magnifications of the second lens unit at the wide-angle end and the telephoto end, and fw and ft respectively represent focal lengths of an entire system at the wide-angle end and the telephoto end.

* * * * *